(12) United States Patent
Saitoh et al.

(10) Patent No.: US 10,495,791 B2
(45) Date of Patent: Dec. 3, 2019

(54) OPTICAL FILM, LIQUID CRYSTAL DISPLAY DEVICE, AND MANUFACTURING METHOD OF OPTICAL FILM

(71) Applicant: FUJIFILM Corporation, Tokyo (JP)

(72) Inventors: Yukito Saitoh, Minami-ashigara (JP); Hideyuki Nishikawa, Minami-ashigara (JP); Kunihiro Atsumi, Minami-ashigara (JP); Wataru Hoshino, Minami-ashigara (JP); Yoshiaki Takada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/639,809

(22) Filed: Jun. 30, 2017

(65) Prior Publication Data

US 2017/0299785 A1    Oct. 19, 2017

Related U.S. Application Data

(63) Continuation of application No. PCT/JP2016/050426, filed on Jan. 8, 2016.

(30) Foreign Application Priority Data

Jan. 9, 2015  (JP) ................. 2015-003129

(51) Int. Cl.
*G02F 1/141* (2006.01)
*G02B 5/08* (2006.01)
(Continued)

(52) U.S. Cl.
CPC .............. *G02B 5/0816* (2013.01); *B32B 7/02* (2013.01); *B32B 37/06* (2013.01); *B32B 37/10* (2013.01);
(Continued)

(58) Field of Classification Search
CPC ................. G02F 1/141; G02F 1/13363; G02F 1/133536; G02F 1/133553;
(Continued)

(56) References Cited

U.S. PATENT DOCUMENTS 6,061,108 A      5/2000   Anderson et al.
2003/0218715 A1*  11/2003  Okawa ..................... G02B 1/08
                                                        349/194

FOREIGN PATENT DOCUMENTS

JP       1-133003 A       5/1989
JP     2000-310780 A     11/2000
(Continued)

OTHER PUBLICATIONS

International Search Report (PCT/ISA/210) issued in PCT/JP2016/050426, dated Mar. 29, 2016.
(Continued)

*Primary Examiner* — Nathanael R Briggs
*Assistant Examiner* — William D Peterson
(74) *Attorney, Agent, or Firm* — Birch, Stewart, Kolasch & Birch, LLP

(57) ABSTRACT

The present invention provides an optical film including a light reflection layer, in which the light reflection layer is a layer in which alignment of liquid crystal molecules is immobilized, the liquid crystal molecule forms a helical structure in a film thickness direction of the light reflection layer, and a tilt angle of the liquid crystal molecule is 15° to 55°. The present invention also provides a manufacturing method of the optical film including curing a polymerizable liquid crystal composition including a liquid crystal compound and a chiral agent interposed between a support and another support. In the optical film according to the present invention, an absolute value of oblique retardation is smaller. In the liquid crystal display device including the
(Continued)

optical film, front surface brightness is high and an oblique change in the shade is suppressed.

19 Claims, 2 Drawing Sheets

(51) Int. Cl.
*B32B 7/02* (2019.01)
*G02F 1/13363* (2006.01)
*B32B 37/06* (2006.01)
*B32B 37/10* (2006.01)
*G02B 5/30* (2006.01)
*G02F 1/1335* (2006.01)
*B32B 37/12* (2006.01)

(52) U.S. Cl.
CPC ............ *G02B 5/305* (2013.01); *G02B 5/3016* (2013.01); *G02F 1/13363* (2013.01); *G02F 1/133536* (2013.01); *G02F 1/133553* (2013.01); *G02F 1/133632* (2013.01); *G02F 1/133636* (2013.01); *B32B 37/12* (2013.01); B32B 2305/72 (2013.01); B32B 2307/42 (2013.01); B32B 2457/202 (2013.01); G02B 5/3083 (2013.01); G02F 2001/133541 (2013.01); G02F 2001/133567 (2013.01); G02F 2001/133638 (2013.01); G02F 2202/023 (2013.01); G02F 2413/01 (2013.01); G02F 2413/05 (2013.01)

(58) Field of Classification Search
CPC ......... G02F 1/133632; G02F 1/133636; G02F 2001/133541; G02F 2001/133638; G02F 2001/133567; G02F 2202/023; G02F 2413/01; G02F 2413/05; C09K 19/0225; G02B 5/0816; G02B 5/305; G02B 5/3083; B32B 7/02; B32B 37/06; B32B 37/10; B32B 37/12

USPC ........................................................ 349/172
See application file for complete search history.

(56) References Cited

FOREIGN PATENT DOCUMENTS

| | | |
|---|---|---|
| JP | 2003-248119 A | 9/2003 |
| JP | 2004-20943 A | 1/2004 |
| JP | 2004-20944 A | 1/2004 |
| JP | 3518660 B2 | 4/2004 |
| JP | 2004-302388 A | 10/2004 |
| JP | 2013-200441 A | 10/2013 |
| JP | 2014-174468 A | 9/2014 |

OTHER PUBLICATIONS

Written Opinion of the International Searching Authority (PCT/ISA/237) issued in PCT/JP2016/050426, dated Mar. 29, 2016.
Notification concerning transmittal of international preliminary report on patentability; International preliminary report on patentability; Notification of transmittal of translation of the international preliminary report on patentability; International preliminary report on patentability; English translation of written opinion of the international searching authority dated Jul. 20, 2017, issued in PCT/JP2016/050426 (Forms PCT/IB/326, PCT/IB/373, PCT/ISA/237, PCT/IB/338).
Korean Office Action dated Nov. 9, 2017, issued in corresponding Korean Patent Appliction No. 10-2017-701775.
Japanese Office Action dated Mar. 6, 2018 for corresponding Japanese Application No. 2016-568749, with English machine translation.
Japanese Office Action, dated Oct. 2, 2018, for corresponding Japanese Application No. 2016-568749, along with an English machine translation.
Chinese Office Action and Search Report for Chinese Application No. 201680004990.3, dated Dec. 21, 2018, with partial English translation.

* cited by examiner

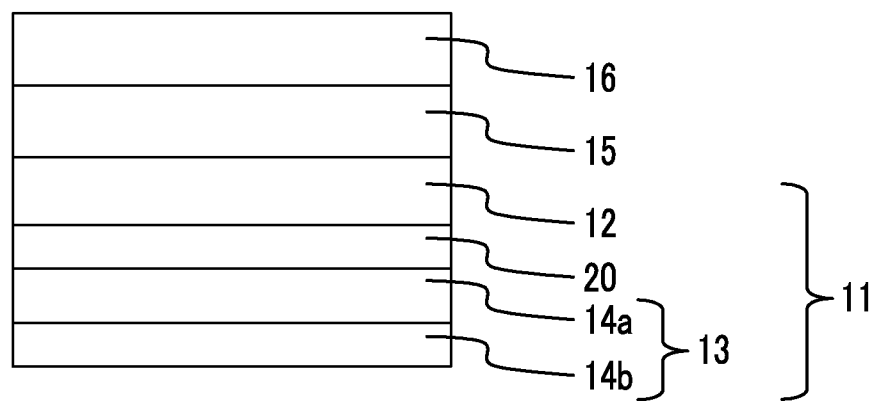
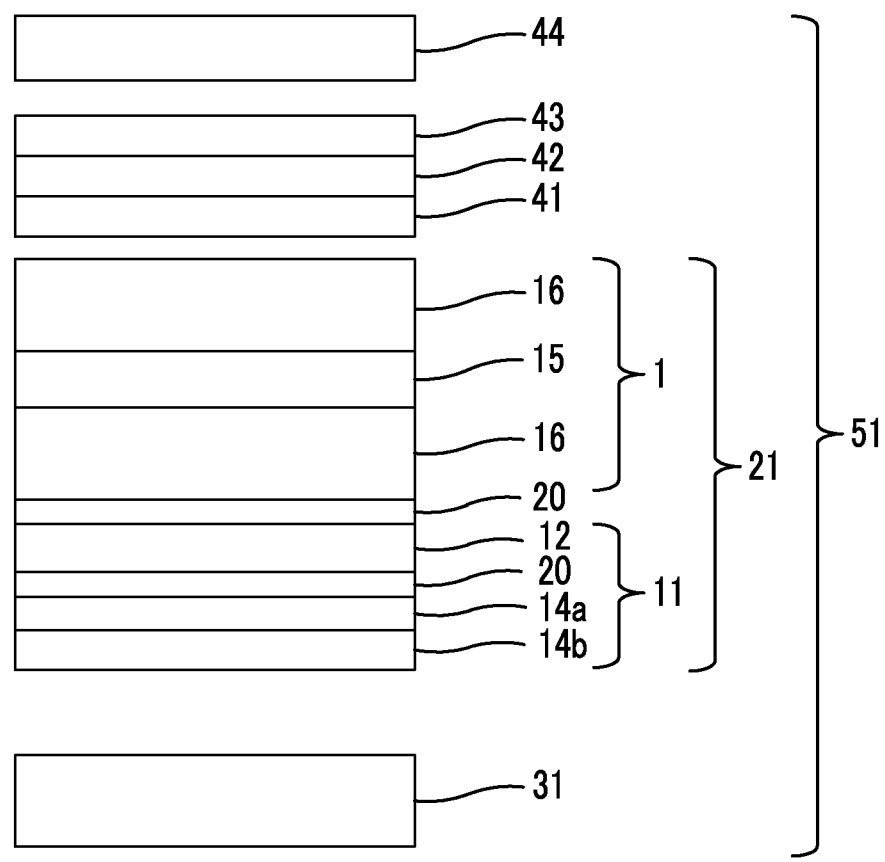

OPTICAL FILM, LIQUID CRYSTAL DISPLAY DEVICE, AND MANUFACTURING METHOD OF OPTICAL FILM

CROSS-REFERENCE TO RELATED APPLICATIONS

This application is a continuation of PCT International Application No. PCT/JP2016/050426 filed on Jan. 8, 2016, which claims priority under 35 U.S.C. § 119 (a) to Japanese Patent Application No. 2015-003129 filed on Jan. 9, 2015, the entire content of which is incorporated herein by reference.

BACKGROUND OF THE INVENTION

1. Field of the Invention

The present invention relates to an optical film and a liquid crystal display device. More specifically, the present invention relates to an optical film including a light reflection layer consisting of a layer in which alignment of liquid crystal molecules is immobilized, and a liquid crystal display device. The present invention also relates to a manufacturing method of an optical film.

2. Description of the Related Art

A cholesteric liquid crystalline phase is a liquid crystalline phase in which a nematically aligned liquid crystal molecule forms a helical structure. Since a cholesteric liquid crystalline phase exhibits circular polarization reflecting properties in a wavelength corresponding to a pitch of this helix, a layer in which a cholesteric liquid crystalline phase is immobilized is used in various fields as a light reflection layer.

For example, in order to reduce electric power consumption of a liquid crystal display device, it is suggested to provide a reflecting and polarizing element including a layer in which a cholesteric liquid crystalline phase is immobilized between a backlight and a backlight-side polarizing plate (for example, see JP1989-133003A (JP-H01-133003A)). With to this reflecting and polarizing element, polarized light that does not penetrate the backlight-side polarizing plate is reflected and recycled, so as to enhance a light utilization rate of the liquid crystal display device.

SUMMARY OF THE INVENTION

It has been known that, when a reflecting and polarizing element including a layer in which a cholesteric liquid crystalline phase is immobilized is combined with a liquid crystal display device, a change in the shade (also referred to as shade unevenness) easily caused by optical characteristics of the cholesteric liquid crystalline phase at the time of being seen from an oblique direction. It is because, in-plane retardation is close to zero in the cholesteric liquid crystalline phase, but the retardation in a thickness direction exists in a degree in which change in a shade occurs at the time of being seen in an oblique direction.

JP3518660B suggests a method of causing a helical pitch of a cholesteric liquid crystalline phase on an incident side of the light to be a short pitch and providing a compensation layer having a refractive index in a vertical direction greater than an in-plane refractive index so as to cancel a change in a shade at the time of being seen in an oblique direction. Here, all of the related arts in addition to JP3518660B are to cancel the change in the shade by using another layer and do not fundamentally cancel a cause occurring the change in the shade of the layer itself in which a cholesteric liquid crystalline phase is immobilized.

An object of the present invention is to provide an optical film in which an absolute value of oblique retardation is smaller as an optical film including a light reflection layer consisting of a layer in which alignment of the liquid crystal molecules is immobilized, and a manufacturing method thereof. Another object of the present invention is to provide a liquid crystal display device in which front surface brightness is high and an oblique change in the shade is suppressed.

The cholesteric liquid crystalline phase is a liquid crystalline phase having a helical structure in which a layer formed corresponding to one molecule of nematically aligned liquid crystal molecules is slightly twisted. In general, the liquid crystal molecule is aligned in parallel to a substrate on which a liquid crystal layer is formed. In the course of the research of various cholesteric liquid crystalline phases, the present inventors have succeeded to form a layer in which a helical structure is formed and a liquid crystalline phase having a liquid crystal molecule oblique to a parallel direction of a substrate in which a liquid crystal layer is formed is immobilized. A liquid crystalline phase in which an oblique liquid crystal molecule forms a helical structure is known as a chiral smectic C phase (SmC*), but a report on an immobilized layer is limited (for example, see JP2000-310780A). The present inventors conducted research in various ways, have found that, when inclination of a liquid crystal molecule has a predetermined angle, an absolute value of oblique retardation of a formed layer is remarkably reduced, further conducted research based on this knowledge, and completed the present invention.

That is, the present invention is to provide [1] to [18] below.

[1] An optical film comprising: a light reflection layer, in which the light reflection layer is a layer in which alignment of liquid crystal molecules is immobilized, in which the liquid crystal molecule forms a helical structure in a film thickness direction of the light reflection layer, and in which a tilt angle of the liquid crystal molecule is 15° to 55°.

[2] The optical film according to [1], in which the tilt angle is 25° to 45°.

[3] The optical film according to [1], in which the tilt angle is 30° to 40°.

[4] The optical film according to [1], in which the tilt angle is 35°.

[5] The optical film according to any one of [1] to [4], in which the light reflection layer is a layer obtained by curing a polymerizable liquid crystal composition including a liquid crystal compound and a chiral agent.

[6] The optical film according to any one of [1] to [5], in which a light reflection layer reflecting blue light, a light reflection layer reflecting green light, and a light reflection layer reflecting red light are included as the light reflection layer.

[7] The optical film according to any one of [1] to [6], in which the light reflection layer is a layer in which a phase obtained by tilting a cholesteric liquid crystalline phase is immobilized.

[8] The optical film according to any one of [1] to [6], in which the light reflection layer is a layer in which a chiral smectic C phase is immobilized.

[9] The optical film according to any one of [1] to [8], further comprising: a λ/4 plate.

[10] The optical film according to any one of [1] to [9], further comprising: a polarizing plate; and a λ/4 plate, in which the polarizing plate, the λ/4 plate, and the light reflection layer are laminated in this order.

[11] A liquid crystal display device comprising: the optical film according to any one of [1] to [10].

[12] A manufacturing method of the optical film according to [1] to [10], comprising: forming the light reflection layer by a method including curing a polymerizable liquid crystal composition including a liquid crystal compound and a chiral agent interposed between a support and another support.

[13] The manufacturing method according to [12], in which the support has an alignment film, and in which the alignment film comes into contact with the polymerizable liquid crystal composition.

[14] The manufacturing method according to [12] or [13], in which the other support has an alignment film, and in which the alignment film comes into contact with the polymerizable liquid crystal composition.

[15] The manufacturing method according to any one of [12] to [14], further comprising: laminating the layers obtained by curing the polymerizable liquid crystal composition to be 2 to 20 layers.

[16] The manufacturing method according to [15], in which the lamination is performed by bringing the layers into contact with each other and performing heating and compression bonding.

[17] The manufacturing method according to any one of [12] to [16], further comprising: stretching the layers obtained by curing the polymerizable liquid crystal composition.

[18] The manufacturing method according to any one of [12] to [17], in which the curing is performed on the polymerizable liquid crystal composition to which a voltage is applied.

According to the present invention, it is possible to provide an optical film in which an absolute value of oblique retardation is smaller as an optical film including a light reflection layer consisting of a layer in which alignment of the liquid crystal molecules is immobilized. By using the optical film according to the present invention, it is possible to provide a liquid crystal display device in which front surface brightness is high and an oblique change in the shade is suppressed.

BRIEF DESCRIPTION OF THE DRAWINGS

FIG. 2 is one aspect of a layer configuration of the optical film according to the present invention used as an optical sheet member.

FIG. 3 is a cross-sectional view schematically illustrating an example of a liquid crystal display device.

DESCRIPTION OF THE PREFERRED EMBODIMENTS

Figure 1A:
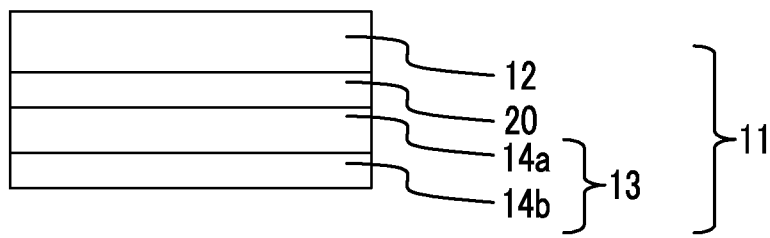
FIGS. 1A to 1C are diagrams illustrating an example of a layer configuration of an optical film according to the present invention used as a brightness enhancement film.

Hereinafter, the present invention will be described in detail.

The following description of configuration requirement is based on a representative embodiment according to the present invention, but the present invention is not limited to such an embodiment. In this specification, a numerical range denoted by using "to" indicates a range including numerical values described before and after "to" as the lower limit value and the upper limit value.

In this specification, a "half-width" of a peak indicates the width of a peak at a height of ½ of a peak height. A reflection center wavelength and a half-width of a light reflection layer are able to be obtained as follows.

When a transmission spectrum of a light reflection layer is measured by using a spectrophotometer UV3150 (manufactured by Shimadzu Corporation), a decreasing peak of transmittance in a selective reflection region is observed. Among two wavelengths at which the transmittance becomes transmittance at a height of ½ of the maximum peak height, when the value of the wavelength on a short wave side is λ1 (nm) and the value of the wavelength on a long wave side is λ2 (nm), the reflection center wavelength and the half-width are able to be denoted by the following expressions.

Reflection Center Wavelength=(λ1+λ2)/2

Half-Width=(λ2−λ1)

In this specification, Re (λ) and Rth (λ) each represent in-plane retardation and retardation in a thickness direction at a wavelength of λ. The unit of both of Re (λ) and Rth (λ) is nm. Re (λ) is measured by allowing light having a wavelength of λ nm to be incident in a film normal direction using KOBRA 21ADH or WR (manufactured by Oji Scientific Instruments). The measurement is able to be performed by manually replacing a wavelength selective filter or by converting a measured value with a program or the like in a case of selecting a measurement wavelength of λ nm. In a case where a film to be measured is denoted by a uniaxial index ellipsoid or a biaxial index ellipsoid, Rth (λ) is calculated by the following method.

In Rth (λ), Re (λ) described above is measured at total 6 points by allowing the light having a wavelength of λ nm to be incident from directions respectively inclined in 10° step from a normal direction to 50° on one side with respect to the film normal direction in which an in-plane slow axis (determined by KOBRA 21ADH or WR) is used as an tilt axis (a rotational axis) (in a case where there is no slow axis, an arbitrary direction of a film plane is used as the rotational axis), and Rth (λ) is calculated by KOBRA 21ADH or WR on the basis of an assumed value of the measured retardation value and the average refractive index, and the input film thickness value. In the above description, in a case of a film having a direction in which a retardation value at a certain tilt angle is zero by using the in-plane slow axis as the rotational axis from the normal direction, a retardation value at an tilt angle greater than the tilt angle described above is changed to have a negative sign, and then, Rth (λ) is calculated by KOBRA 21ADH or WR. Furthermore, a retardation value is measured from two arbitrarily tilted directions by using the slow axis as the tilt axis (the rotational axis) (in a case where there is no slow axis, an arbitrary direction of the film plane is used as the rotational axis), and Rth is able to be calculated by Expression (A) described below and Expression (B) described below on the basis of an assumed value of the retardation value and the average refractive index, and the input film thickness value.

Expression (A)

$$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times$$

$$\frac{d}{\cos\left(\sin^{-1}\left(\frac{\sin(-\theta)}{nx}\right)\right)}$$

Furthermore, Re (θ) described above indicates a retardation value in a direction tilted by an angle of θ from the normal direction. In Expression (A), nx represents a refractive index in a slow axis direction in the plane, ny represents a refractive index in a direction orthogonal to nx in the plane, and nz represents a refractive index in a direction orthogonal to nx and ny. d represents a film thickness.

$$Rth=((nx+ny)/2-nz)\times d \qquad \text{Expression (B)}$$

In a case where the film to be measured is a so-called film not having an optic axis which is not able to be denoted by a uniaxial index ellipsoid or a biaxial index ellipsoid, Rth (λ) is calculated by the following method. In Rth (λ), Re (λ) described above is measured at 11 points by allowing the light having a wavelength of λ nm to be incident from directions respectively tilted in 10° step from −50° to +50° with respect to the film normal direction in which the in-plane slow axis (determined by KOBRA 21ADH or WR) is used as the tilt axis (the rotational axis), and Rth (λ) is calculated by KOBRA 21ADH or WR on the basis of an assumed value of the measured retardation value and the average refractive index, and the input film thickness value. In the measurement described above, a catalog value of various optical films in a polymer handbook (JOHN WILEY&SONS, INC) is able to be used as the assumed value of the average refractive index. In a case where the value of the average refractive index is not known in advance, the value of the average refractive index is able to be measured by using an ABBE'S REFRACTOMETER. The value of the average refractive index of a main optical film will be exemplified as follows: cellulose acylate (1.48), a cycloolefin polymer (1.52), polycarbonate (1.59), polymethyl methacrylate (1.49), and polystyrene (1.59). The assumed values of the average refractive index and the film thickness are input, and thus, nx, ny, and nz are calculated by KOBRA 21ADH or WR. Nz=(nx−nz)/(nx−ny) is further calculated by the calculated nx, ny, and nz.

A method using polarization ellipsometer is able to be applied as a method of obtaining Rth of layer obtained by immobilizing alignment of liquid crystal molecules.

For example, as described in M. Kimura et al. Jpn. J. Appl. Phys. 48 (2009) 03B021, in a case where an ellipsometer measurement method is used, the thickness, the pitch, the twisted angle, and the like of the cholesteric liquid crystal layer are able to be obtained, and the value of Rth is able to be obtained therefrom. A twisted angle refers to an angle indicating how much a cholesteric liquid crystal layer is twisted from the front surface to the bottom surface. For example, in a case of being twisted in one rotation, a twisted angle is 360°. Even if a polarimeter (Spectroscopic polarimeter: for example, AxoScan manufactured by Axometrics Inc.) is used instead of an ellipsometer measurement method, a thickness of a cholesteric liquid crystal layer, a pitch, a twisted angle, and the like can be obtained, and the value of Rth can be obtained therefrom. In-plane retardation (front surface retardation) or oblique retardation can be measured by using polarimeter AxoScan manufactured by Axometrics Inc.

In this specification, oblique retardation is a measured value of retardation at a polar angle of 60°, that is, an angle oblique from the normal direction of the film surface is 60°. The sign of the oblique retardation coincides to retardation when it is seen that a slow axis thereof is in a parallel direction to a film surface. For example, in a case where it is seen that the slow axis is in a parallel direction to a film surface (for example, Rth>C-plate of 0), a sign of the oblique retardation is positive, and in a case where it is seen that the slow axis is in a vertical direction to the film surface (for example, Rth<C-plate of 0), a sign of the oblique retardation is negative.

In this specification, "visible light" indicates light having a wavelength of 380 nm to 780 nm. In this specification, in a case where a measurement wavelength is not particularly described, the measurement wavelength is 550 nm.

In this specification, the blue light indicates light having a wavelength of 380 to 499 nm, the green light indicates light having a wavelength of 500 to 599 nm, and the red light indicates light having a wavelength of 600 to 780 nm. The infrared light indicates light having a wavelength of 780 to 850 nm.

In this specification, an angle (for example, an angle of "90°" or the like), and a relationship thereof (for example "orthogonal", "parallel", "intersect at 45°", and the like) include an error range which is allowable in the technical field belonging to the present invention. For example, the angle indicates a range of less than an exact angle ±10°, and an error with respect to the exact angle is preferably less than or equal to 5°, and is more preferably less than or equal to 3°.

In this specification, the nematic alignment indicates an alignment state of liquid crystal molecules in which liquid crystal molecules are one-dimensionally aligned in one direction.

In this specification, the smectic alignment indicates an alignment state of liquid crystal molecules in which liquid crystal molecules are aligned in a predetermined direction and a layered structure is formed. This layered structure can be detected with X-ray diffraction.

In this specification, a "tilt angle" means an angle formed by the director direction of the liquid crystal molecule to a layer plane (specifically, an optical film plane) and means the maximum angle among angles formed by a direction of the maximum refractive index with a layer plane in an index ellipsoid of the liquid crystal compound. Accordingly, in the rod-like liquid crystal compound having positive optical anisotropy, the tilt angle means an angle formed between a long axis direction, that is, a director direction, and a layer plane of the rod-like liquid crystal compound. In this specification, the liquid crystal molecule means a molecule of a liquid crystal compound in a polymerizable liquid crystal composition. In a case where the liquid crystal compound is a polymerizable liquid crystal compound and is polymerized by polymerization, the liquid crystal molecule means a partial structure corresponding to mesogen (a rigid main chain portion exhibiting liquid crystallinity) of the polymerizable liquid crystal compound.

A tilt angle of the liquid crystal molecule can be obtained from the polarized light analysis measurement of the film.

For example, the tilt angle can be obtained by measuring angular dependence of the retardation with a polarimeter (Spectroscopic polarimeter: for example, AxoScan of Axometrics Inc.) and performing fitting with an optical parameter such as a tilt angle.

In the same manner, the tilt angle can be obtained by using an ellipsometer. Details of the measuring method are disclosed in Jpn. J. Appl. Phys. 48 (2009) 03B021.

An error range of the tilt angle is ±5°.

In this specification, a layer that is obtained by curing the polymerizable liquid crystal composition and in which alignment of the liquid crystal molecules is immobilized may be referred to a "liquid crystal layer" or a "liquid crystal film". The layer in which alignment of liquid crystal molecules is not immobilized and that includes driving liquid crystal molecules is referred to as a "driving liquid crystal layer".

In this specification, an "absorption axis" and a "transmission axis" of a polarizer or a polarizing plate indicate a direction in which an angle between the absorption axis and the transmission axis is 90°.

In this specification, a "slow axis" of a retardation film or the like indicates a direction in which a refractive index is maximized.

In this specification, numerical values, numerical ranges, and qualitative expressions (for example, "equivalent", "equal", and the like) indicating optical properties of each member such as phase difference region, a retardation film, and a liquid crystal layer are interpreted as indicating numerical values, numerical ranges, and properties including error which is generally allowable in a liquid crystal display device and the members used therein.

In this specification, "front" indicates a normal direction with respect to an image display surface of the crystal display device.

In this specification, a reflection polarizer and a polarizer are separately used.

<Optical Film>

The optical film is a film having an optical function such as a light reflecting film. The optical film according to the present invention includes a light reflection layer including a liquid crystal molecule. The optical film according to the present invention may include one layer of the light reflection layers or may include two layers, three layers, or four layers or more. The optical film may include another layer such as a support and an alignment film, and may include another optical functional layer, depending on the use thereof. For example, an optical film including a λ/4 plate can be used as a brightness enhancement film.

<Light Reflection Layer>

The light reflection layer of the optical film according to the present invention is a layer in which alignment of liquid crystal molecules is immobilized, that is, a layer obtained by immobilizing alignment of liquid crystal molecules. In the light reflection layer of the optical film according to the present invention, the liquid crystal molecule forms a helical structure in a film thickness direction of the light reflection layer. In this specification, the fact that a helical structure is formed in the film thickness direction of the light reflection layer means that a helical axis in a helical structure is a normal direction of a light reflection layer. The liquid crystal molecule has a tilt angle of 15° to 55°.

The light reflection layer of the optical film according to the present invention may be specifically a layer (a layer obtained by tilting a cholesteric liquid crystalline phase is immobilized) formed by immobilizing a structure in which liquid crystal molecules in a cholesteric liquid crystalline phase have a tilt angle of 15° to 55°. Otherwise, the light reflection layer of the optical film according to the present invention may be a layer in which the liquid crystal molecules forming a chiral smectic C phase at a tilt angle of 15° to 55° are immobilized.

The cholesteric liquid crystalline phase is well-known as a liquid crystal structure in which liquid crystal molecules form a helical structure and that exhibits circular polarization selective reflectivity. With respect to the cholesteric liquid crystalline phase, the related arts thereof can be referred to. As a film including a layer in which a cholesteric liquid crystalline phase is immobilized, a plurality of films formed of a composition including a polymerizable liquid crystal compound are known. With respect to the light reflection layer of the optical film according to the present invention, the related arts thereof can be referred to.

A smectic C phase means a liquid crystalline phase in which liquid crystal molecules are arranged so as to be slightly inclined from the normal line of the layer in the layered structure formed in a smectic phase. A chiral smectic C phase refers to a phase forming structures in which a plurality of groups of liquid crystal molecules in which helical structures are arranged in the director direction in a smectic C phase slightly change the director direction little by little and form a layered structure such that a structure an arrangement of the molecules rotates. As the liquid crystalline phase having a helical structure, the chiral smectic C phase is similar to a cholesteric liquid crystalline phase and has circular polarization selective reflection characteristics having a reflection center wavelength $\lambda$ based on a helical cycle which is the same as in the cholesteric liquid crystalline phase.

The absolute value of the oblique retardation of the light reflection layer in a wavelength of 550 nm is preferably 0 to 100 nm, more preferably 0 to 50 nm, and even more preferably 0 to 40 nm.

[Tilt Angle]

A tilt angle of the liquid crystal molecule in the light reflection layer of the optical film according to the present invention is in the range of 15° to 55°. Even in a case where the optical film according to the present invention includes a light reflection layer having two or more layers, a tilt angle of the liquid crystal molecule in each light reflection layer is in the range of 15° to 55°. The present inventors have found that, if layers are formed in the alignment in which liquid crystal molecules are twisted in this tilt angle, a light reflection layer having a smaller absolute value of the oblique retardation is applied. The tilt angle is preferably in the range of 25° to 45°, more preferably 30° to 40°, and most preferably 35°. It is preferable that tilt angles of the respective layers in an optical film including two or more light reflection layers are in the range of ±5°. This angle can be obtained, for example, by measuring tilt angles for each light reflection layer. In the preferable tilt angle, an absolute value of oblique retardation is not caused by a wavelength and becomes a small value. Therefore, even if a lamination order of blue, green, and red of the light reflection layer is changed, an optical film having a small absolute value of the oblique retardation can be obtained. Even in a case of a pitch gradient layer in which a twisted pitch is changed in a thickness direction, if the tilt angle in the range described above, it is possible to obtain an optical film having a smaller absolute value of the oblique retardation.

The well-known cholesteric liquid crystalline phase in the related art is a phase having a tilt angle corresponding to 0°. The well-known chiral smectic C phase in the related art generally has a tilt angle greater than 55°. Therefore, in the light reflection layer of the optical film according to the present invention, the structure formed by the liquid crystal molecules is not known to the best of the present inventor's knowledge.

If a voltage is applied to a cholesteric liquid crystalline phase, a phenomenon of forming a layer state in which a tilt angle (angle of director) of liquid crystal molecules is inclined to a helical axis is known (Tilt cholesteric or diagonal helicoidal cholesteric. R. B. Meyer, Appl. Phys.

Lett. (1968), 12, 281., V. Borshch, et al, Nat. Commun. (2013), 4, 2635.). However, a structure in which alignment is immobilized with the tilt angle in the desired angle described above is not known to the best of the present inventor's knowledge.

[Helical Structure]

The light reflection layer of the optical film according to the present invention indicates selective reflection having the reflection center wavelength λ corresponding to a helical cycle in a helical structure. The light reflection layer obtained by immobilizing liquid crystal molecules forming a helical structure selectively reflects any one of right circular polarization or left circular polarization in a wavelength range indicating selective reflection and transmits the other circular polarization. The reflection center wavelength λ depends on a pitch P (helical cycle) in a helical structure and follows a relationship of λ=n×P with an average refractive index n of the light reflection layer. With respect to a half-width Δλ of the selective reflection, Δλ depends on birefringence Δn of the liquid crystal compound and the pitch P and follows a relationship of Δλ=Δn×P. Therefore, according to the adjustment of the pitch in this helical structure, it is possible to adjust a wavelength indicating circular polarization selective reflection. The pitch in the helical structure depends on types of a chiral agent used together with the polymerizable liquid crystal compound or addition concentration thereof. Therefore, a desired pitch can be obtained by adjusting these. In one light reflection layer, it is possible to widen the band of the reflection by gradually changing a cycle P in the film thickness direction.

Whether the reflection of the light reflection layer is right circular polarization or left circular polarization (sense of circular polarization) depends on the twisted direction of the helix. As the right circular polarization reflection layer and the left circular polarization reflection layer, light reflection layers of which respective twisted directions of the helices are right and left may be used. With respect to the sense of the circular polarization, in a case where light proceeds forward, a case where a distal end of an electric field vector rotates in a clockwise direction according to the time elapse is defined as right circular polarization, and a case where a distal end of an electric field vector rotates in a counter-clockwise direction is defined as left circular polarization. The helical direction of the helical structure is defined in the same manner.

With respect to the sense of a helix or a measuring method of the pitch, methods in the cholesteric liquid crystalline phase disclosed in page 46 of "Easy Steps in Liquid Crystal Chemistry Experiment" edited by The Japanese Liquid Crystal Society, Sigma Publishing, published in 2007 and page 196 of "Liquid Crystal Handbook" Editorial Committee of Liquid Crystal Handbook, Maruzen can be used in the same manner.

<Manufacturing Method of Light Reflection Layer>

The light reflection layer can be manufactured by using the polymerizable liquid crystal composition as a material. After the surface of a substrate or the like is coated with the polymerizable liquid crystal composition, liquid crystal molecules in the polymerizable liquid crystal composition are aligned by drying or heating, the aligned liquid crystal molecules are immobilized by curing reaction, so as to manufacture the light reflection layer.

[Polymerizable Liquid Crystal Composition]

The polymerizable liquid crystal composition includes the liquid crystal compound. The polymerizable liquid crystal composition for forming the light reflection layer may contain other components in addition to a chiral agent, a polymerization initiator, an alignment assistant agent, and the like. Hereinafter, respective components in the polymerizable liquid crystal composition are described.

With respect to the manufacturing of the polymerizable liquid crystal composition, JP2013-203827A (disclosed in [0016] to [0148]) and pp. 60 to 63 of Fuji Film Research & Development No. 50 (2005) can be referred to.

(Liquid Crystal Compound)

Examples of the liquid crystal compound include a rod-like liquid crystal compound and a disk-like liquid crystal compound.

Azomethines, azoxys, cyanobiphenyls, cyanophenyl esters, benzoic acid esters, phenyl cyclohexane carboxylic acid esters, cyanophenyl cyclohexanes, cyano-substituted phenyl pyrimidines, alkoxy-substituted phenyl pyrimidines, phenyl dioxanes, trans, and alkenyl cyclohexyl benzonitriles are preferably used as the rod-like liquid crystal compound. It is possible to use not only low molecular liquid crystalline molecules as described above but also high molecular liquid crystalline molecules.

It is more preferable that alignment is immobilized by polymerizing the rod-like liquid crystal compound, and compound disclosed in Makromol. Chem., Vol. 190, p. 2255 (1989), Advanced Materials, Vol. 5, p. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), JP2001-328973A, and the like are able to be used as a polymerizable rod-like liquid crystal compound. For example, a rod-like liquid crystal compound disclosed in JP1999-513019A (JP-H11-513019A) or JP2007-279688A is able to be preferably used as the rod-like liquid crystal compound.

For example, a disk-like liquid crystal compound disclosed in JP2007-108732A or JP2010-244038A is able to be preferably used as the disk-like liquid crystal compound, but the disk-like liquid crystal compound is not limited thereto.

Hereinafter, a preferred example of the disk-like liquid crystal compound will be described, but the present invention is not limited thereto.

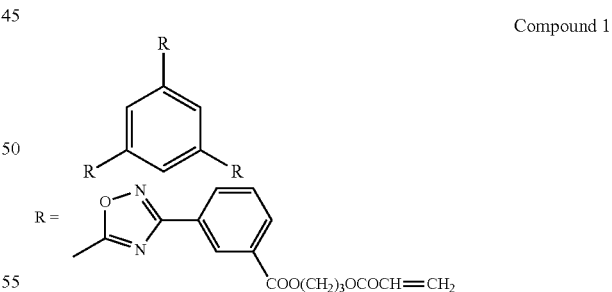

Compound 1

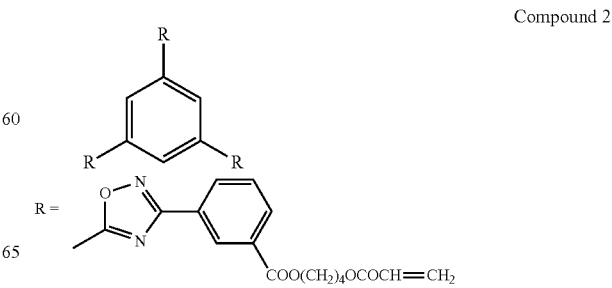

Compound 2

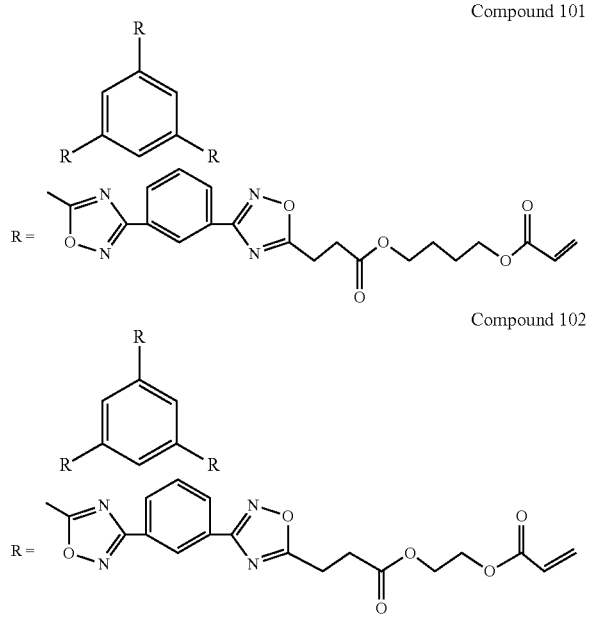

Compound 101

Compound 102

(Chiral Agent)

The chiral agent is a compound for adjusting the helical cycle, and will be also referred to as a chiral agent. In the present invention, various known chiral agents (for example, a chiral agent disclosed in Liquid Crystal Device Handbook, Chapter 3, pp. 4-3, a chiral agent for TN and STN, and a chiral agent disclosed in p. 199, Japan Society for the Promotion of Science edited by the 142nd committee in 1989) are able to be used. In general, the chiral agent includes an asymmetric carbon atom, but an axial asymmetric compound or a planar asymmetric compound which does not include the asymmetric carbon atom is also able to be used as the chiral agent. In an example of the axial asymmetric compound or the planar asymmetric compound, binaphthyl, helicene, paracyclophane, and a derivative thereof are included. The chiral agent may have a polymerizable group. In a case where the chiral agent has a polymerizable group and the rod-like liquid crystal compound used together also has a polymerizable group, a polymer having a repeating unit derived from the rod-like liquid crystal compound and a repeating unit derived from the chiral agent is able to be formed by a polymerization reaction between the chiral agent having a polymerizable group and a polymerizable rod-like liquid crystal compound. In the aspect, it is preferable that the polymerizable group of the chiral agent having a polymerizable group is identical to the polymerizable group of the polymerizable rod-like liquid crystal compound. Accordingly, the polymerizable group of the chiral agent is preferably an unsaturated polymerizable group, an epoxy group, or an aziridinyl group, is more preferably an unsaturated polymerizable group, and is particularly preferably an ethylenically unsaturated polymerizable group.

The chiral agent described above may be a liquid crystal compound.

Examples of the chiral agent exhibiting a strong twisting force include chiral agents disclosed in JP2010-181852A, JP2003-287623A, JP2002-80851A, JP2002-80478A, and JP2002-302487A, and the chiral agents are able to be preferably used in the present invention. Isomannide compounds having a corresponding structure are able to be used as isosorbide compounds disclosed in the publications, and isosorbide compounds having a corresponding structure are able to be used as isomannide compounds disclosed in the publications.

(Polymerization Initiator)

Examples of a photopolymerization initiator include an α-carbonyl compound (disclosed in each of the specifications of U.S. Pat. Nos. 2,367,661A and 2,367,670A), acyloin ether (disclosed in the specification of U.S. Pat. No. 2,448,828A), α-hydrocarbon-substituted aromatic acyloin compounds (disclosed in the specification of U.S. Pat. No. 2,722,512A), a polynuclear quinone compound (disclosed in each of the specifications of U.S. Pat. Nos. 3,046,127A and 2,951,758A), a combination of a triarylimidazole dimer and p-amino phenyl ketone (disclosed in the specification of U.S. Pat. No. 3,549,367A), an acridine compound and a phenazine compound (disclosed in JP1985-105667A (JP-S60-105667A) and in the specification of U.S. Pat. No. 4,239,850A) and an oxadiazole compound (disclosed in the specification of U.S. Pat. No. 4,212,970A), an acyl phosphine oxide compound (disclosed in JP1988-40799B (JP-S63-40799B), JP1993-29234B (JP-1105-29234B), JP1998-95788A (JP-H10-95788A), and JP1998-29997A (JP-H10-29997A)), and the like.

(Solvent)

The polymerizable liquid crystal composition may contain a solvent. An organic solvent is preferably used as a solvent of a composition for forming each of the light reflection layers. Examples of the organic solvent include amide (for example, N,N-dimethyl formamide), sulfoxide (for example, dimethyl sulfoxide), a heterocyclic compound (for example, pyridine), hydrocarbon (for example, benzene and hexane), alkyl halide (for example, chloroform and dichloromethane), ester (for example, methyl acetate and butyl acetate), ketone (for example, acetone, methyl ethyl ketone, and cyclohexanone), and ether (for example, tetrahydrofuran and 1,2-dimethoxyethane). The alkyl halide and the ketone are preferable. Two or more types of organic solvents may be used in combination.

[Coating of Polymerizable Liquid Crystal Composition and Alignment of Liquid Crystal Molecules]

The coating of the polymerizable liquid crystal composition is able to be performed by a method in which the polymerizable liquid crystal composition is set to be in a solution state by a solvent or the polymerizable liquid crystal composition is set to be a liquid material such as a melting liquid by heating, and the polymerizable liquid crystal composition is applied by a suitable method such as a roll coating method or a gravure printing method, and a spin coating method. The coating of the polymerizable liquid crystal composition is able to be performed by various methods such as a wire bar coating method, an extrusion coating method, a direct gravure coating method, a reverse gravure coating method, and a die coating method. The polymerizable liquid crystal composition is ejected from a nozzle by using an ink jet device, and thus, a coated film is able to be formed.

The coating of the polymerizable liquid crystal composition may be performed on a support. The coating of the polymerizable liquid crystal composition is preferably performed on an alignment film surface on the support. The polymerizable liquid crystal composition may be interposed between a support and another support. For example, it is preferable that the coated polymerizable liquid crystal composition is further interposed with other supports. The other support may be identical to or different from the support to which coating is performed. It is preferable that the other support also has an alignment film and the alignment film is interposed so as to come into contact with the polymerizable liquid crystal composition. In this step, the alignment of the liquid crystal molecule can be adjusted. In a case of interposing, the interposing is performed such that a film thickness of the polymerizable liquid crystal composition preferably becomes 0.1 µm to 1,000 µm. A liquid crystal layer for one pitch may be manufactured by performing interposing, alignment, and curing with the film thickness of the polymerizable liquid crystal composition in the range of 0.1 µm to 5 µm. If the film thickness is reduced, minute adjustment of a tilt angle becomes possible by causing the film thickness to be small, in some cases. Thereafter, one light reflection layer may be formed as the liquid crystal layer for one pitch, by laminating 2 to 20 layers, preferably 3 to 12 layers, and more preferably 5 to 10 layers manufactured in the same manner. Particularly, in a case where a light reflection layer is a layer in which a phase obtained by tilting a cholesteric liquid crystalline phase is immobilized, it is preferable that the light reflection layer is formed according to this laminating. At the time of laminating, in a case where the liquid crystal layer is formed on the surface of the rubbing-treated alignment film or the like, it is preferable that laminating is performed in a manner that a direction corresponding to the rubbing treatment is aligned. As the laminate, an adhesive described below may be used, or bonding may be performed by bringing the layers to come into contact with each other and performing heating and compression bonding.

At the time of interposing the support, heating may or may not be performed. It is preferable that the liquid crystal molecules are aligned in a state in which the support is interposed.

For example, in an embodiment in which the polymerizable liquid crystal composition is prepared as a coating liquid containing a solvent, a state in which a liquid crystal molecule having a tilt angle of 15° to 55° is formed in a helical structure by drying the coated film and removing the solvent. Otherwise, heating at a transition temperature to a cholesteric liquid crystalline phase or a chiral smectic C phase may be performed. For example, first, the coated film is heated to a temperature of an isotropic phase, and then, is cooled to a transition temperature of a cholesteric liquid crystalline phase or a chiral smectic C phase, and thus, it is possible to stably set the polymerizable liquid crystal composition in the state of the cholesteric liquid crystalline phase or the chiral smectic C phase. In view of manufacturing suitability or the like, the liquid crystalline phase transition temperature of the polymerizable liquid crystal composition described above is preferably in a range of 10° C. to 250° C. and is more preferably in a range of 10° C. to 150° C. In a case where the liquid crystalline phase transition temperature is higher than or equal to 10° C., a cooling step is not necessary in order to decrease the temperature to a temperature range at which a liquid crystalline phase is exhibited. If the liquid crystalline phase transition temperature is lower than or equal to 250° C., a high temperature is not required in order to set the polymerizable liquid crystal composition in an isotropic liquid state of which the temperature is higher than the temperature range at which the liquid crystalline phase is exhibited, and waste of thermal energy, deformation or modification of a substrate, and the like can be prevented.

[Curing]

After that, the alignment state of the molecules of the liquid crystal compound is maintained and immobilized according to the curing of the polymerizable liquid crystal composition. It is preferable that the curing is performed by a polymerization reaction of a polymerizable group introduced into liquid crystalline molecules.

A thermal polymerization reaction using a thermal polymerization initiator and a photopolymerization reaction using a photopolymerization initiator are included in the polymerization reaction. The photopolymerization reaction is preferable. It is preferable that an ultraviolet ray is used in light irradiation for polymerizing the liquid crystalline molecules. The irradiation energy is preferably 20 mJ/cm$^2$ to 50 J/cm$^2$ and more preferably 100 to 800 mJ/cm$^2$. Since photopolymerization reaction is promoted, light irradiation may be performed under a heating condition.

In order to promote curing reaction, ultraviolet irradiation under the heating condition may be performed. Particularly, at the time of forming the light reflection layer, the temperature at the time of ultraviolet irradiation is preferably maintained in the temperature range in which alignment is not disturbed.

An oxygen concentration in the atmosphere is involved in a degree of polymerization, and does not reach a desired degree of polymerization in the air, and in a case where film hardness is insufficient, it is preferable to decrease the oxygen concentration in the atmosphere by a method such as nitrogen substitution. Oxygen concentration is preferably less than or equal to 10%, is more preferably less than or equal to 7%, and is most preferably less than or equal to 3%. The reaction rate of the curing reaction (for example, a polymerization reaction) which is performed by the ultraviolet irradiation is preferably greater than or equal to 70%, is more preferably greater than or equal to 80%, and is even more preferably greater than or equal to 90% from the viewpoint of retaining the mechanical strength of a layer or suppressing the outflow of an unreacted substance from the layer. In order to improve the reaction rate, a method of increasing the irradiation dose of the ultraviolet ray to be emitted or polymerization under a nitrogen atmosphere or under heating conditions is effective. A method in which first, the polymerization is performed, and then, the temperature is retained in a high temperature state which is higher than the polymerization temperature, and thus, the reaction is further performed by a thermal polymerization reaction or a method in which the ultraviolet irradiation is performed again is able to be used. The reaction rate is able to be measured by comparing absorption intensities of infrared vibration spectrums of a reactive group (for example, a polymerizable group) before and after the reaction.

At the time of curing or before the curing, a voltage may be applied to the polymerizable liquid crystal composition. A phase in which a cholesteric liquid crystalline phase is tilted can be obtained by applying a voltage after the liquid crystal molecule is aligned to the cholesteric liquid crystalline phase and causing liquid crystal molecules to maintain inclination. As the voltage applying method, the document (R. B. Meyer, Appl. Phys. Lett. (1968), 12, 281., V. Borshch, et al, Nat. Commun. (2013), 4, 2635) can be referred to.

The liquid crystal film after curing may be stretched.

It is sufficient, insofar as optical properties based on the alignment of the molecules in the liquid crystal compound of the polymerizable liquid crystal composition, for example, the optical properties based on the helical structure are retained in a layer, and it is not necessary that the polymerizable liquid crystal composition of the λ/4 plate or the light reflection layer after being cured exhibits liquid crystallinity anymore. For example, the polymerizable liquid crystal composition has a high molecular weight due to the curing reaction, and thus, the liquid crystallinity may not be exhibited any more.

In the formation of the light reflection layer, the alignment of the liquid crystal molecule is immobilized by the curing described above, so as to form the light reflection layer. At this point, a helical structure in which liquid crystal molecules are formed may be immobilized. Here, as a state in which the alignment of the liquid crystal molecule is immobilized, a state in which the alignment of liquid crystal molecules in which a helical structure is formed is retained is the most typical and preferred aspect. The state is not limited thereto, and specifically, indicates a state where the immobilized alignment shape is able to be stably and continuously maintained without fluidity in a layer including liquid crystal molecules or without a change in the shape of the alignment due to an external field or an external force, in a temperature range of generally 0° C. to 50° C. and in a temperature range of −30° C. to 70° C. under more rigorous conditions.

In the forming of the light reflection layer, as described above, liquid crystal layers for one pitch formed of immobilized liquid crystal molecules may be laminated.

<Support>

The optical film may include a support. The support may function as a layer supporting a layer formed from a polymerizable composition. The optical film may not include a support at the time of forming a light reflection layer. For example, after a light reflection layer is formed by using a glass or transparent film as a support at the time of forming a light reflection layer, only the light reflection layer may be peeled off from the support at the time of film formation. In this specification, the light reflection layer and the peeled support may be referred to as a temporary support. As described above, a second support used in order to interpose the polymerizable liquid crystal composition may be a temporary support.

In a case where the support does not have a function as a part or all of the λ/4 plate described below, Re of the support is preferably 0 nm to 50 nm, is more preferably 0 nm to 30 nm, and is even more preferably 0 nm to 10 nm. It is preferable that Re of the support is set to be in the range described above since a light leakage of reflected light is able to be reduced to the extent of being invisible.

It is preferable that retardation (Rth) of the support in the thickness direction is preferably −20 to 20 nm and is more preferably −10 to 10 nm.

Example of the material of the polymer film used as the support include a cellulose acylate film (for example, a cellulose triacetate film (a refractive index of 1.48), a cellulose diacetate film, a cellulose acetate butyrate film, a cellulose acetate propionate film), polyolefin such as polyethylene and polypropylene, a polyester-based resin film such as polyethylene terephthalate or polyethylene naphthalate, a polyacrylic resin film such as a polyether sulfone film and polymethyl methacrylate, a polyurethane-based resin film, a polyester film, a polycarbonate film, a polysulfone film, a polyether film, a polymethyl pentene film, a polyether ketone film, a (meth)acrylonitrile film, polyolefin, and polymer having an alicyclic structure (a norbornene-based resin (ARTON: Product Name, manufactured by JSR Corporation), amorphous polyolefin (ZEONEX: Product Name, manufactured by Zeon Corporation)), and the like. Among them, the triacetyl cellulose, the polyethylene terephthalate, and the polymer having an alicyclic structure are preferable, and the triacetyl cellulose is particularly preferable.

A transparent support having a thickness of approximately 5 μm to 150 μm is able to be used, and the thickness of the transparent support is preferably 5 μm to 80 μm, and is more preferably 20 μm to 60 μm. The transparent support may be formed by laminating a plurality of layers. In order to suppress external light reflection, it is preferable as the thickness of the transparent support becomes thinner, but when the thickness is less than 5 μm, the strength of the film becomes weaker, and thus, setting the thickness to be less than 5 μm does not tend to be preferable. In order to enhance adhesion between the transparent support and a layer disposed on the transparent support (the adhesive layer, the vertical alignment layer, or a retardation layer), the transparent support may be subjected to a surface treatment (for example, a glow discharge treatment, a corona discharge treatment, an ultraviolet ray (UV) treatment, and a flame treatment). The adhesive layer (the undercoat layer) may be disposed on the transparent support. It is preferable that a transparent support to which slidability is applied in a transporting step or a transparent support which is formed by applying a polymer layer in which inorganic particles having an average particle diameter of approximately 10 nm to 100 nm are mixed at a mass ratio of solid contents of 5% to 40% onto one surface of the support or by cocasting with the support in order to prevent a back surface from being bonded to the surface after being wound is used in the transparent support or a long transparent support.

When the support is a temporary support, a glass plate may be used. For example, GLASS 7059 manufactured by Corning Incorporated may be used. As the temporary support, any plastic films exemplified as a support can be used, but it is preferable that the light reflection layer can be peeled off, transcribed, and transferred.

In a case where the optical film is a brightness enhancement film, the λ/4 plate may function as a support.

<Alignment Layer>

An alignment layer may be included in the optical film according to the present invention.

It is preferable that an alignment layer is provided on the surface of the support used at the time of forming a chiral smectic C phase. The support may be a temporary support that is peeled off after the light reflection layer is formed or after the liquid crystal layer for one pitch is formed. At this point, the alignment film may be peeled off together with the temporary support or may not peeled off.

As the alignment film, for example, an alignment film applying a high tilt angle to liquid crystal molecules such as an alignment film including a liquid crystal alignment agent disclosed in JP2008-026891A and an alignment film disclosed in JP1998-096931A (JP-H10-096931A) can be used.

A film thickness of the alignment layer is preferably in the range of 0.1 to 20 μm and more preferably in the range of 0.5 to 10 μm.

The alignment film is preferably subjected to a rubbing treatment.

—Rubbing Treatment—

The surface of the alignment layer, the temporary support, the λ/4 plate, or the light reflection layer which is coated with the polymerizable liquid crystal composition, as necessary, may be subjected to a rubbing treatment. In general, the rubbing treatment is able to be performed by rubbing the surface of a film containing a polymer as a main component with paper or cloth in a constant direction. A general method of the rubbing treatment, for example, is disclosed in "Liquid Crystal Handbook" (published by Maruzen Company, Limited, Oct. 30, 2000).

A method disclosed in "Liquid Crystal Handbook" (published by Maruzen Company, Limited) is able to be used as a method of changing a rubbing density. A rubbing density (L) is able to be quantified by Expression (A) described below.

$$L = Nl(1 + 2\pi rn/60v) \quad \text{Expression (A)}$$

In Expression (A), N represents the number of rubbing treatments, l represents a contact length of a rubbing roller, r represents the radius of the roller, n represents the number of rotations of the roller (rpm), and v represents a stage shifting speed (per second).

In order to increase the rubbing density, the number of rubbing treatments may increase, the contact length of the rubbing roller may increase, the radius of the roller may increase, the number of rotations of the roller may increase, and the stage shifting speed may decrease, and in order to decrease the rubbing density, these factors are adjusted vice versa. Conditions at the time of performing the rubbing treatment can be referred to conditions disclosed in JP4052558B.

When the polymerizable liquid crystal composition is interposed between two supports (glass substrate and the like) in which alignment layers are provided, an alignment film is provided on the polymerizable liquid crystal composition side. In a case where the alignment film is subjected to a rubbing treatment, it is preferable that the rubbing direction is parallel.

<Adhesive Layer (Pressure Sensitive Adhesive Layer), Adhesive>

An optical film may include an adhesive layer for bonding respective layers.

In this specification, "adhesive" is used as the concept which also includes "pressure sensitive adhesive".

The pressure sensitive adhesive agent which is used in the adhesive layer, for example, indicates a substance having a ratio (tan δ=G"/G') of a modulus of loss elasticity G" to a modulus of storage elasticity G' measured by a dynamic viscoelasticity measurement device of 0.001 to 1.5, and includes a so-called pressure sensitive adhesive agent, a substance which is easy to creep, or the like. Examples of the pressure sensitive adhesive agent which is able to be used in the present invention include an acrylic pressure sensitive adhesive agent and a polyvinyl alcohol-based adhesive agent, but are not limited thereto.

Examples of the adhesive agent include an aqueous solution of boron compound, a curable adhesive agent of an epoxy compound as disclosed in JP2004-245925A which does not have an aromatic ring in the molecules, an active energy ray curable type adhesive agent disclosed in JP2008-174667A which includes a photopolymerization initiator having a molar absorption coefficient at a wavelength of 360 nm to 450 nm of greater than or equal to 400 and an ultraviolet ray curable compound as an essential component, an active energy ray curable type adhesive agent disclosed in JP2008-174667A which contains (a) a (meth)acrylic compound having two or more (meth)acryloyl groups in the molecules, (b) a (meth)acrylic compound having a hydroxyl group and only one polymerizable double bond in the molecules, and (c) phenol ethylene oxide-modified acrylate or nonyl phenol ethylene oxide-modified acrylate in the total amount of 100 parts by mass of a (meth)acrylic compound, and the like.

An adjustment method of the refractive index of the adhesive layer is not particularly limited, and for example, a method disclosed in JP1999-223712A (JP-H11-223712A) is able to be used. In the method disclosed in JP1999-223712A (JP-H11-223712A), the following embodiment is particularly preferable.

Examples of the pressure sensitive adhesive agent which is used in the adhesive layer described above are able to include resins such as a polyester-based resin, an epoxy-based resin, a polyurethane-based resin, a silicone-based resin, and an acrylic resin. One type of the resin may be independently used or two or more types thereof may be used by being mixed. In particular, the acrylic resin is preferable from the viewpoint of excellent reliability with respect to water resistance, heat resistance, light resistance, and the like, an excellent adhesion force and excellent transparency, and ease of adjusting the refractive index to be suitable for a liquid crystal display. Examples of the acrylic pressure sensitive adhesive agent are able to include a homopolymer or a copolymer of an acrylic monomer such as an acrylic acid and ester thereof, a methacrylic acid and ester thereof, acrylamide, and acrylonitrile, and a copolymer of at least one type of acrylic monomer described above and an aromatic vinyl monomer of vinyl acetate, maleic anhydride, styrene, and the like. In particular, a copolymer formed of main monomers such as ethylene acrylate, butyl acrylate, and 2-ethyl hexyl acrylate which exhibits pressure sensitive adhesiveness, a monomer such as vinyl acetate, acrylonitrile, acrylamide, styrene, methacrylate, and methyl acrylate which become an aggregation force component, and functional group-containing monomers such as a methacrylic acid, an acrylic acid, an itaconic acid, hydroxy ethyl methacrylate, hydroxy propyl methacrylate, dimethyl amino ethyl methacrylate, acrylamide, methylol acrylamide, glycidyl methacrylate, and maleic anhydride which improve an adhesion force or provide a cross-linking starting point, in which a glass transition point (Tg) is in a range of −60° C. to −15° C., and a weight average molecular weight is in a range of 200,000 to 1,000,000 is preferable.

In the present invention, a sheet-like photocurable type pressure sensitive-adhesive agent (disclosed in TREND of Research Annual Review, Vol. 14, published on Jan. 1, 2011 by Toagosei Company, Limited) is able to be used in the adhesive layer. As with the pressure sensitive adhesive agent, the sheet-like photocurable type adhesive agent, allows optical films to be easily bonded to each other, is cross-linked and cured by an ultraviolet ray (UV), and has an improved modulus of storage elasticity, an improved adhesion force, and improved heat resistance, and an adhesion method thereof is preferable.

The adhesive layer described above may be disposed between the respective members configuring the brightness enhancement film and an optical sheet member described below. For example, the adhesive layer may be disposed between the λ/4 plate and the reflection polarizer, between the light reflection layers of the reflection polarizer, between the polarizing plate or the polarizer and the λ/4 plate, or the like.

In the optical sheet member according to the present invention described below, a difference in refractive indices between the reflection polarizer and a layer adjacent to the reflection polarizer on the polarizing plate side is preferably less than or equal to 0.15, is more preferably less than or equal to 0.10, and is particularly preferably less than or equal to 0.05. Examples of the layer adjacent to the reflection polarizer on the polarizing plate side described above are able to include the adhesive layer described above.

<Brightness Enhancement Film>

Figure 1B:
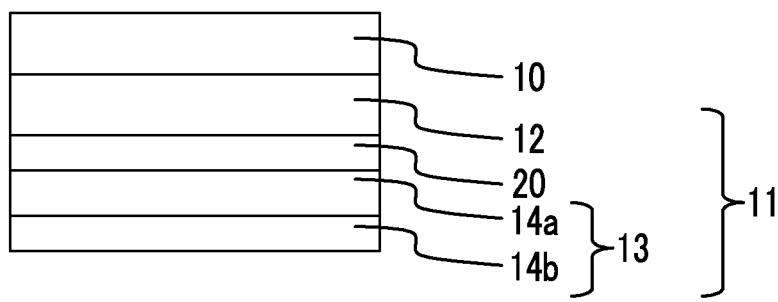
Figure 1C:
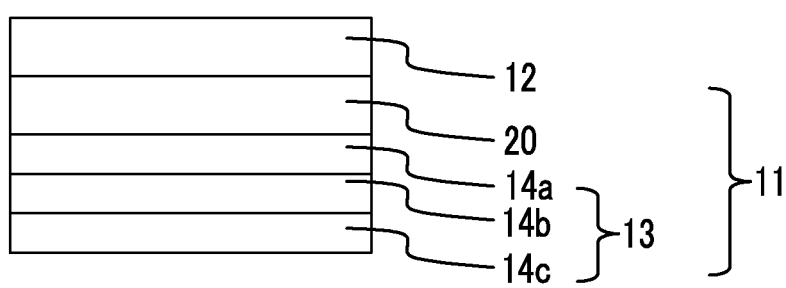

The optical film according to the present invention can be used as a brightness enhancement film by being combine with a λ/4 plate. An example of the layer configuration of the brightness enhancement film is provided in FIGS. 1A to 1C.

In the brightness enhancement film, the brightness of the liquid crystal display device is improved by the following mechanism at the time of incorporating the brightness enhancement film in the liquid crystal display device.

The light reflection layer formed by immobilizing the cholesteric liquid crystalline phase which is included in the reflection polarizer of the brightness enhancement film reflects at least one (circular polarization in a first polarization state) of right circular polarization or left circular polarization in a wavelength range in the vicinity of the reflection center wavelength and transmits the other one (circular polarization in a second polarization state). The direction and the polarization state of the reflected circular polarization in the second polarization state are randomized and recirculated by a reflection member described below (also referred to as a light guide device and an optical resonator), and a part of the light is reflected again by the reflection polarizer as the circular polarization in the first polarization state and a part of the remaining light is transmitted as the circular polarization in the second polarization state, and thus, a light utilization rate on a backlight-side increases and the brightness of the liquid crystal display device is able to be enhanced.

The polarization state of the light exiting from the reflection polarizer, that is, the polarization state of transmitted light and reflected light of the reflection polarizer, for example, is able to be measured by performing polarization measurement using Axoscan manufactured by Axometrics Inc.

[Reflection Polarizer]

The light reflection layer functions as a reflection polarizer in the brightness enhancement film. The reflection polarizer includes at least one light reflection layer, preferably two or more light reflection layers. The reflection polarizer preferably includes two to four light reflection layers and more preferably includes two to three light reflection layers.

In this specification, in a case where two or more light reflection layers of the reflection polarizer are mentioned, a light reflection layer closest to a λ/4 plate is referred to as a first light reflection layer, and the layers are referred to as a first light reflection layer, a second light reflection layer, and a third light reflection layer sequentially from the λ/4 plate.

The reflection polarizer preferably includes a blue light reflection layer that reflects blue light, a green light reflection layer that reflects green light, and a red light reflection layer that reflects red light. At this point, it is preferable that an absolute value of oblique retardation of the blue light reflection layer at a wavelength of 450 nm is 0 to 75 nm, an absolute value of oblique retardation of the green light reflection layer at a wavelength of 550 nm is 0 to 90 nm, and an absolute value of oblique retardation of the red light reflection layer at a wavelength of 650 nm is 0 to 100 nm. It is more preferable that an absolute value of oblique retardation of the blue light reflection layer at a wavelength of 450 nm is 0 to 50 nm, an absolute value of oblique retardation of the green light reflection layer at a wavelength of 550 nm is 0 to 60 nm, and an absolute value of oblique retardation of the red light reflection layer at a wavelength of 650 nm is 0 to 70 nm. It is even more preferable that an absolute value of oblique retardation of the blue light reflection layer at a wavelength of 450 nm is 0 to 30 nm, an absolute value of oblique retardation of the green light reflection layer at a wavelength of 550 nm is 0 to 35 nm, and an absolute value of oblique retardation of the red light reflection layer at a wavelength of 650 nm is 0 to 40 nm.

The oblique retardation of the light reflection layer is a value of the retardation in a wavelength range of the oblique reflection range that can be obliquely set on an external side. For example, in the reflecting layer that has selective reflection in an area with 550 nm on the front surface as a center, a central wavelength of the selective reflection in the oblique direction is deviated to a short wave side and a polar angle becomes 60°, and the selective reflection region is deviated near 450 nm. At this point, there is no selective reflection in 550 nm in the polar angle of 60°, but retardation occurs, and this is set as oblique retardation.

In the optical film that functions as a brightness enhancement film, it is preferable that the reflection polarizer preferably has a function of reflecting blue light, green light, and red light. The reflection polarizer may include a blue light reflection layer, a green light reflection layer, and a red light reflection layer or may include at least one layer of a layer that reflects blue light and green light on one layer, a layer that reflects green light and red light on one layer, and a layer that reflects blue light, green light, and red light on one layer.

[λ/4 Plate]

The optical film according to the present invention may further include a λ/4 plate and function as a brightness enhancement film. The λ/4 plate refers to an optical anisotropic layer in which in-plane retardation Re(λ) at a specific wavelength λ nm satisfies Re(λ)=λ/4. The λ/4 plate functions as a layer for converting circular polarization obtained by penetrating a reflection polarizer to linearly polarized light in the brightness enhancement film.

The λ/4 plate preferably satisfies at least one of Expressions (A) to (C) below and more preferably satisfies all of Expressions (A) to (C) below.

450 nm/4−35 nm<Re(450)<450 nm/4+35 nm        Expression (A)

550 nm/4−35 nm<Re(550)<550 nm/4+35 nm        Expression (B)

630 nm/4−35 nm<Re(630)<630 nm/4+35 nm        Expression (C)

Rth (550) of the λ/4 plate is preferably −70 to 70 nm, is more preferably −40 to 40 nm, and is particularly preferably −20 to 20 nm.

A method disclosed in JP1996-271731A (JP-H08-271731A) is able to be used as a manufacturing method of the λ/4 plate. The λ/4 plate may be a single layer, or a laminate of two or more layers, and it is preferable that the λ/4 plate is a laminate of two or more layers. In particular, it is more preferable that the λ/4 layer is a (approximately optically monoaxial or biaxial) retardation film or one or more layers of the retardation films including at least one of liquid crystal compounds (a disk-like liquid crystal, a rod-like liquid crystal, or a cholesteric liquid crystal) formed by polymerizing a liquid crystal monomer exhibiting a nematic liquid crystal layer or a smectic liquid crystal layer. A retardation film which is stretched in the transport direction, stretched in a direction vertical to the transport direction, and 45-degree stretched at the time of manufacturing the support can be selected as the retardation film, and in consideration of manufacturability, a retardation film formed by performing 45-degree stretching with respect to a cyclic polyolefin resin (a norbornene-based resin) in which an optical sheet member is able to be prepared by a so-called roll to roll process, or a film including a layer in which a transparent film is subjected to an alignment treatment, liquid crystal compounds are aligned at a 45-degree azimuth with respect to the transport direction at the time of manufacturing the film are preferable. At this time, in a case where a transparent substrate having positive Rth is used, it is preferable that a disk-like liquid crystal compound having negative Rth in an alignment state is used.

Hereinafter, the material and the manufacturing method of the λ/4 plate will be described in detail.

The material used in the λ/4 plate included in the brightness enhancement film is not particularly limited. Various polymer films, for example, a polyester-based polymer such as cellulose acylate, a polycarbonate-based polymer, polyethylene terephthalate, or polyethylene naphthalate, an acrylic polymer such as polymethyl methacrylate, a styrene-based polymer such as polystyrene or an acrylonitrile-styrene copolymer (an AS resin), and the like are able to be used. A polymer film is prepared by using one type or two or more types of polymers are selected from polyolefin such as polyethylene and polypropylene, a polyolefin-based polymer such as an ethylene-propylene copolymer, an amide-based polymer such as a vinyl chloride-based polymer, nylon, or aromatic polyamide, an imide-based polymer, a sulfone-based polymer, a polyether sulfone-based polymer, a polyether ether ketone-based polymer, a polyphenylene sulfide-based polymer, a vinylidene chloride-based polymer, a vinyl alcohol-based polymer, a vinyl butyral-based polymer, an arylate-based polymer, a polyoxymethylene-based polymer, an epoxy-based polymer, or a polymer in which the polymers described above are mixed as a main component, and the polymers are used for preparing an optical film in a combination of satisfying the properties described above.

The λ/4 plate may be an optical anisotropy support having a desired λ/4 function in the support itself, or may be a plate including an optical anisotropic layer or the like on the support formed of a polymer film.

When the λ/4 plate is the optical anisotropy support having a desired λ/4 function in the support itself, for example, the optical anisotropy support is able to be obtained by a method in which a polymer film is subject to a monoaxial stretching treatment or a biaxially stretching treatment, or the like. The type of polymer is not particularly limited, but a polymer having excellent transparency is preferably used. Examples of the polymer include the materials used in the λ/4 plate, a cellulose acylate film (for example, a cellulose triacetate film (a refractive index of 1.48), a cellulose diacetate film, a cellulose acetate butyrate film, and a cellulose acetate propionate film), polyolefin such as polyethylene and polypropylene, a polyester resin-based film such as polyethylene terephthalate and polyethylene naphthalate, a polyacrylic resin film such as a polyether sulfone film and a polymethyl methacrylate, a polyurethane-based resin film, a polyester film, a polycarbonate film, a polysulfone film, a polyether film, a polymethyl pentene film, a polyether ketone film, a (meth)acrylonitrile film, polyolefin, a polymer having an alicyclic structure (a norbornene-based resin (ARTON: Product Name, manufactured by JSR Corporation), amorphous polyolefin (ZEONEX: Product Name, manufactured by Zeon Corporation)), and the like. Among them, the triacetyl cellulose, the polyethylene terephthalate, and the polymer having an alicyclic structure are preferable, and the triacetyl cellulose is particularly preferable.

As described below, an angle between a slow axis direction of the λ/4 plate and an absorption axis direction of the polarizing plate is 30° to 60°, is preferably 35° to 55°, is more preferably 40° to 50°, and is particularly preferably 45°. When the polarizing plate is prepared in a roll to roll manner, in general, a longitudinal direction (a transport direction) is an absorption axis direction, and thus, it is preferable that an angle between the slow axis direction of the λ/4 plate and the longitudinal direction is 30° to 60°. A manufacturing method of the λ4 plate in which the angle between the slow axis direction and the longitudinal direction is preferably 30° to 60°. A manufacturing method of the λ/4 plate in which the angle between the slow axis direction and the longitudinal direction is 30° to 60° is not particularly limited insofar as an alignment axis of a polymer is inclined at a desired angle by being continuously stretched in a direction at 30° to 60° with respect to the longitudinal direction, and a known method is able to be adopted as the manufacturing method. A stretching machine used in oblique stretching is not particularly limited, but a known tenter type stretching machine of the related art is able to be used in which a feeding force or pulling force, or a taking off force having speeds different in right and left is able to be applied in a horizontal direction or a vertical direction. Examples of a tenter type stretching machine include a horizontally monoaxially stretching machine, a simultaneously biaxially stretching machine, and the like, but the tenter type stretching machine is not particularly limited insofar as a long film is able to be continuously subjected to an oblique stretching treatment, and various types of stretching machines are able to be used.

For example, methods disclosed in JP1975-83482A (JP-S50-83482A), JP1990-113920A (JP-H02-113920A), JP1991-182701A (JP-H03-182701A), JP2000-9912A, JP2002-86554A, JP2002-22944A, and WO2007/111313A are able to be used as a method of the oblique stretching.

In a case where the λ/4 plate include the optical anisotropic layer or the like on the support formed of the polymer film, other layers are laminated on the support, and thus, a desired λ/4 function is obtained. The configuration material of the optical anisotropic layer is not particularly limited, but the optical anisotropic layer may be a layer which is formed of a composition containing a liquid crystal compound and exhibits optical anisotropy expressed by aligning molecules of the liquid crystal compound or a layer which has optical anisotropy expressed by stretching a polymer film and by aligning the polymer in the film, or may be both of the layers. That is, the optical anisotropic layer is able to be configured of one or two or more biaxial films, and is also able to be configured of a combination of two or more monoaxial films such as a combination of a C plate and an A plate. Naturally, the optical anisotropic layer is able to be configured of a combination of one or more biaxial films and one or more monoaxial films.

It is preferable that the λ/4 plate includes at least one layer formed of the composition containing the liquid crystal compound. That is, it is preferable that the λ/4 plate is a laminate of the polymer film (the support) and the optical anisotropic layer formed of the composition containing the liquid crystal compound.

The type of liquid crystal compound which is used for forming the optical anisotropic layer is not particularly limited. For example, an optical anisotropic layer which is obtained by forming a low molecular liquid crystal compound in nematic alignment or smectic alignment in a liquid crystal state, and then, by immobilizing the alignment by photocross-linking or thermal cross-linking, or an optical anisotropic layer which is obtained by forming a high molecular liquid crystal compound in nematic alignment or smectic alignment in a liquid crystal state, and then, by immobilizing the alignment by cooling is able to be used. Furthermore, in the present invention, even in a case where the liquid crystal compound is used in the optical anisotropic layer, the optical anisotropic layer is a layer formed by immobilizing the liquid crystal compound by polymerization or the like, and it is not necessary to exhibit liquid crystallinity any more after the layer is formed. A polymerizable liquid crystal compound may be a polyfunctional polymerizable liquid crystal or a monofunctional polymerizable liquid crystal compound. The liquid crystal compound may be a disk-like liquid crystal compound, or may be a rod-like liquid crystal compound. In the present invention, the disk-like liquid crystal compound is more preferable.

As the material for manufacturing the λ/4 plate which is formed of a composition containing a liquid crystal compound, a polymerizable liquid crystal composition can be used light reflection layer. However, it is preferable that the polymerizable liquid crystal composition for manufacturing the λ/4 plate does not contain a chiral agent.

In the optical anisotropic layer described above, it is preferable that the molecules of the liquid crystal compound are immobilized in any one alignment state of a vertical alignment, a horizontal alignment, a hybrid alignment, and an tilt alignment. In order to prepare a phase difference plate having symmetric view angle dependency, it is preferable that a disk surface of the disk-like liquid crystal compound is substantially vertical to a film surface (the surface of the optical anisotropic layer), or a long axis of the rod-like liquid crystal compound is substantially horizontal to the film surface (the surface of the optical anisotropic layer). The disk-like liquid crystal compound being substantially vertical to the film surface indicates that the average value of an angle between the film surface (the surface of the optical anisotropic layer) and the disk surface of the disk-like liquid crystal compound is in a range of 70° to 90°. The average value of the angle is more preferably 80° to 90°, and is even more preferably 85° to 90°. The rod-like liquid crystal compound being substantially horizontal to the film surface indicates that an angle between the film surface (the surface of the optical anisotropic layer) and a director of the rod-like liquid crystal compound is in a range of 0° to 20°. The angle is more preferably 0° to 10°, and is even more preferably 0° to 5°.

The optical anisotropic layer described above is able to be formed by applying a coating liquid containing the liquid crystal compound such as the rod-like liquid crystal compound or the disk-like liquid crystal compound, and as desired, a polymerization initiator or an alignment control agent described below, or other additives onto the support. It is preferable that the optical anisotropic layer is formed by forming the alignment layer on the support, and by coating the surface of the alignment layer with the coating liquid described above.

<Manufacturing Method of Brightness Enhancement Film>

As the manufacturing method of the brightness enhancement film, an independently manufactured λ/4 plate and light reflection layers may be bonded with adhesive, at least one light reflection layer may be formed by directly coating the surface of the λ/4 plate or the surface of the other light reflection layer.

<Optical Sheet Member>

The optical sheet member includes the brightness enhancement film and the polarizing plate. An example of the layer configuration of the optical sheet member is illustrated in FIG. 2. It is preferable that an angle between a slow axis of the λ/4 plate and an absorption axis of the polarizer is 30° to 60°, the polarizing plate, and the λ/4 plate and the reflection polarizer are directly in contact with each other in this order, or are laminated through the adhesive layer. The slow axis indicates a direction in which the refractive index is maximized.

The optical sheet member may include a polarizing plate protective film. In a case where the polarizing plate protective film is not disposed between the polarizer and the reflection polarizer, the reflection polarizer may be directly disposed on the polarizer or may be disposed on the polarizer through the adhesive agent. The λ/4 plate may also function as the polarizing plate protective film, and the polarizing plate protective film may also function as a part of the λ/4 plate which is realized by laminating the polarizing plate protective film.

Among the protective films, a thermoplastic resin having excellent transparency, excellent mechanical strength, excellent heat stability, excellent moisture blocking properties, excellent isotropy, and the like is used as a protective film which is arranged on a side opposite to the liquid crystal cell. Specific examples of such a thermoplastic resin include a cellulose resin such as triacetyl cellulose, a polyester resin, a polyether sulfone resin, a polysulfone resin, a polycarbonate resin, a polyamide resin, a polyimide resin, a polyolefin resin, a (meth)acrylic resin, a cyclic polyolefin resin (a norbornene-based resin), a polyarylate resin, a polystyrene resin, a polyvinyl alcohol resin, and a mixture thereof.

[Polarizing Plate]

The polarizing plate may be formed only of the polarizer, and it is preferable that the polarizing plate is configured of the polarizer and the polarizing plate protective film which protects at least one surface of the polarizer. It is also preferable that the polarizing plate is formed of the polarizer and two polarizing plate protective films (hereinafter, also referred to as a protective film) which are arranged on both sides of the polarizer.

(Polarizer)

It is preferable that a polarizer in which iodine is adsorptively aligned on a polymer film is used as the polarizer described above. The polymer film is not particularly limited, but various polymer films are able to be used. Examples of the polymer film include a hydrophilic polymer film such as a polyvinyl alcohol-based film, a polyethylene terephthalate-based film, an ethylene-vinyl acetate copolymer-based film, a partially saponified film thereof, and a cellulose-based film, an polyene-based orientation film of a dehydration treatment product of polyvinyl alcohol or a dehydrochlorination treatment product of polyvinyl chloride, and the like. Among them, it is preferable that the polyvinyl alcohol-based film having excellent dyeability of iodine is used as the polarizer.

Polyvinyl alcohol or a derivative thereof is used as the material of the polyvinyl alcohol-based film. Examples of the derivative of the polyvinyl alcohol include polyvinyl formal, polyvinyl acetal, and the like, and olefin such as ethylene and propylene, an unsaturated carboxylic acid such as an acrylic acid, a methacrylic acid, and a crotonic acid, and alkyl ester thereof, and an acrylamide-modified derivative.

The degree of polymerization of the polymer which is the material of the polymer film described above is generally 500 to 10,000, is preferably in a range of 1,000 to 6,000, and is more is preferably in a range of 1,400 to 4,000. In a case of a saponification film, the degree of saponification, for example, is preferably greater than or equal to 75 mol %, is more preferably greater than or equal to 98 mol %, and is more preferably in a range of 98.3 to 99.8 mol %, from the viewpoint of solubility with respect to water.

The polymer film (an unstretched film) described above is subjected to at least a monoaxial stretching treatment and an iodine dyeing treatment according to a normal method. A boric acid treatment and a cleaning treatment are able to be performed. The polymer film (a stretched film) which has been subjected to the treatment described above is subjected to a drying treatment and becomes the polarizer according to a normal method.

The thickness of the polarizer is generally 5 to 80 μm, is preferably 5 to 50 μm, and is more preferably 5 to 25 μm.

In the optical properties of the polarizer, single body transmittance at the time of being measured by a polarizer single body is preferably greater than or equal to 43%, and is more preferably in a range of 43.3% to 45.0%. It is preferable that orthogonal transmittance measured by preparing two polarizers described above, and by superposing the two polarizers such that an angle between the absorption axes of the two polarizers is 90° is small, and practically, the orthogonal transmittance is preferably greater than or equal to 0.00% and less than or equal to 0.050%, and is more preferably less than or equal to 0.030%. Practically, the degree of polarization is preferably greater than or equal to 99.90% and less than or equal to 100%, and is particularly preferably greater than or equal to 99.93% and less than or equal to 100%. Even when the optical properties of the polarizing plate are measured, it is preferable that approximately the same optical properties as those described above are able to be obtained.

The polarizer is able to be obtained by methods disclosed in JP2006-293275A, JP2009-98653A, JP2001-350021A, and JP2001-141926A.

(Polarizing Plate Protective Film)

A thermoplastic resin having excellent transparency, excellent mechanical strength, excellent thermal stability, excellent moisture blocking properties, and excellent isotropy is used as the protective film described above. Specific examples of such a thermoplastic resin include a cellulose resin such as triacetyl cellulose, a polyester resin, a polyether sulfone resin, a polysulfone resin, a polycarbonate resin, a polyamide resin, a polyimide resin, a polyolefin resin, a (meth)acrylic resin, a cyclic polyolefin resin (a norbornene-based resin), a polyarylate resin, a polystyrene resin, a polyvinyl alcohol resin, and a mixture thereof.

The cellulose resin is ester of cellulose and a fatty acid. Specific example of such a cellulose ester-based resin include triacetyl cellulose, diacetyl cellulose, tripropyl cellulose, dipropyl cellulose, and the like. Among them, the triacetyl cellulose is particularly preferable. Various products are commercially available as the triacetyl cellulose, and are advantageous from the viewpoint of easy obtainability and cost. Examples of a commercially available product of the triacetyl cellulose include "UV-50", "UV-80", "SH-80", "TD-80U", "TD-TAC", and "UZ-TAC" (Product Name), manufactured by Fujifilm Corporation, "KC Series" manufactured by Konica Minolta, Inc., and the like.

Specific examples of the cyclic polyolefin resin preferably include a norbornene-based resin. The cyclic olefin-based resin is a general term of a resin which is polymerized by using cyclic olefin as polymerization unit, and examples of the cyclic olefin-based resin include resins disclosed in JP1989-240517A (JP-H01-240517A), JP1991-14882A (JP-H03-14882A), JP1991-122137A (JP-H03-122137A), and the like. Specific examples of the cyclic olefin-based resin include a ring opening (co)polymer of cyclic olefin, an addition polymer of cyclic olefin, a copolymer of cyclic olefin and α-olefin such as ethylene and propylene (representatively, a random copolymer), and a graft polymer in which the polymers are modified by an unsaturated carboxylic acid or a derivative thereof, a hydride thereof, and the like. Specific examples of the cyclic olefin include a norbornene-based monomer.

Various products are commercially available as the cyclic polyolefin resin. Specific example of the cyclic polyolefin resin include "ZEONEX" and "ZEONOR" (Product Name) manufactured by Zeon Corporation, "ARTON" (Product Name) manufactured by JSR Corporation, "TOPAS" (Product Name) manufactured by TICONA GmbH, and "APEL" (Product Name) manufactured by Mitsui Chemicals, Inc.

An arbitrary suitable (meth)acrylic resin is able to be adopted as the (meth)acrylic resin. Examples of the (meth)acrylic resin include poly(meth)acrylic acid ester such as polymethyl methacrylate, a methyl methacrylate-(meth)acrylic acid copolymer, a methyl methacrylate-(meth)acrylic acid ester copolymer, a methyl methacrylate-acrylic acid ester-(meth)acrylic acid copolymer, a methyl (meth)acrylate-styrene copolymer (an MS resin and the like), and a polymer having an alicyclic hydrocarbon group (for example, a methyl methacrylate-cyclohexyl methacrylate copolymer, a methyl methacrylate-norbornyl (meth)acrylate copolymer, and the like). Preferably, examples of the (meth)acrylic resin include poly(meth)acrylic acid alkyl having 1 to 6 carbon atoms such as polymethyl (meth)acrylate. More preferably, examples of the (meth)acrylic resin include a methyl methacrylate-based resin having methyl methacrylate as a main component (50 to 100 mass %, and preferably 70 to 100 mass %).

Specific examples of the (meth)acrylic resin include ACRYPET VH or ACRYPET VRL20A manufactured by Mitsubishi Rayon Co., Ltd, a (meth)acrylic resin disclosed in JP2004-70296A which has a ring structure in the molecules, and a (meth)acrylic resin having high Tg which is obtained by cross-linking in the molecules or a cyclization reaction in the molecules.

A (meth)acrylic resin having a lactone ring structure is able to be used as the (meth)acrylic resin. This is because the (meth)acrylic resin having a lactone ring structure has high heat resistance, high transparency, and high mechanical strength which is obtained by biaxially stretching.

The thickness of the protective film is able to be suitably set, and is generally approximately 1 to 80 μm from the viewpoint of workability such as strength or handling, thin layer properties, and the like. In particular, the thickness of the protective film is preferably 1 to 60 μm, and is more preferably 5 to 40 μm, and is even more preferably 5 to 25 μm.

<Liquid Crystal Display Device>

The optical film according to the present invention can be a configuration member of a liquid crystal display device, for example, as a brightness enhancement film or an optical sheet member.

The liquid crystal display device has a display side polarizing plate, a liquid crystal cell, a backlight-side polarizing plate, and a backlight unit, in this order. The brightness enhancement film may be arranged between the backlight-side polarizing plate and the backlight unit.

An embodiment of the liquid crystal display device is a configuration in which a liquid crystal cell in which a driving liquid crystal layer is interposed between facing substrates of which at least one includes an electrode, and the liquid crystal cell is arranged between two polarizing plates. The liquid crystal display device includes the liquid crystal cell in which a liquid crystal is sealed between upper and lower substrates, changes the alignment state of the liquid crystal by applying a voltage, and thus, is able to display an image. As necessary, the liquid crystal display device may include an associated functional layer such as a polarizing plate protective film or a retardation film for view angle compensation, and an adhesive layer. The retardation film for view angle compensation may be included between the respective liquid crystal cells of the polarizer. The liquid crystal display device may include other members such as a forward scattering layer, a primer layer, an antistatic layer, and an undercoat layer along with (or instead of) a color filter substrate, a thin layer transistor substrate, a lens film, a diffusion sheet, a hard coat layer, an anti-reflection layer, a low reflection layer, an antiglare layer, and the like.

In FIG. 3, an example of the configuration of the liquid crystal display device is illustrated. In FIG. 3, in a liquid crystal display device 51, the backlight unit 31, the optical sheet member 21 (a laminate of a reflection polarizer 11 and the backlight-side polarizing plate 1), a thin layer transistor substrate 41, a liquid crystal cell 42, a color filter substrate 43, and a display side polarizing plate 44 are laminated in this order.

In FIG. 3, the configuration of the brightness enhancement film is an example, and the brightness enhancement film which is applied to the liquid crystal display device is not limited to the example illustrated in FIG. 3.

The configuration of the liquid crystal cell is not particularly limited, and a liquid crystal cell having a general configuration is able to be adopted. The liquid crystal cell, for example, includes a pair of substrates which are arranged to face each other, and a driving liquid crystal layer interposed between the pair of substrates, and as necessary, may include a color filter layer and the like. The driving mode of the liquid crystal cell is not particularly limited, and various modes such as a twisted nematic (TN) mode, a super twisted nematic (STN) mode, a vertical alignment (VA) mode, an in-plane switching (IPS) mode, and an optically compensated bend (OCB) cell mode are able to be used.

[Backlight Unit]

In the liquid crystal display device, the optical film (brightness enhancement film or optical sheet member) is able to be used by being combined with a backlight unit. The backlight unit may include a light source which emits blue light having a light emission center wavelength in a wavelength range of 430 to 500 nm, green light having a light emission center wavelength in a wavelength range of 500 to 600 nm, and red light having at least a part of a light emission intensity peak in a wavelength range of 600 to 700 nm.

It is also preferable that the backlight unit includes the reflection member that converts the polarization state or performs reflection of light which is emitted from the light source described above and is reflected on the brightness enhancement film described above or the optical sheet member described above in the rear of the light source described above.

The configuration of the backlight may be an edge light mode in which a light guide plate, a reflection plate, or the like is included as a configuration member, or may be a direct backlight mode. It is also preferable that the backlight unit includes the reflection member that converts the polarization state or performs reflection of light which is emitted from the light source and is reflected on the optical sheet member in the rear of the light source described above. Such a reflection member is not particularly limited, and known reflection members disclosed in JP3416302B, JP3363565B, JP4091978B, and JP3448626B, and the like are able to be used.

It is preferable that the light source of the backlight has a wavelength conversion member including a blue light emitting diode emitting the blue light described above, and a fluorescent material which emits the green light described above and the red light described above when the blue light described above of the blue light emitting diode described above is incident thereon.

A blue light emitting diode emitting the blue light described above, a green light emitting diode emitting the green light described above, and a red light emitting diode emitting the red light described above may be used as the light source of the backlight.

The light source of the backlight may be a white light source such as a white light emitting diode (LED).

Examples of the fluorescent material include a yttrium-aluminum-garnet-based yellow fluorescent body, a terbium-aluminum-garnet-based yellow fluorescent body, and the like. The fluorescent wavelength of the fluorescent material is able to be controlled according to a change in the particle diameter of the fluorescent body.

In the liquid crystal display device, it is preferable that the blue light emitting diode emitting the blue light described above and the fluorescent material emitting the green light described above and the red light described above when the blue light described above of the blue light emitting diode described above is incident thereon are quantum dot members (for example, quantum dot sheets or bar-like quantum dot bars), and the quantum dot member is arranged between the optical sheet member and a blue light source. Such a quantum dot member is not particularly limited, well-known members can be used. However, for example, JP2012-169271A, SID' 12 DIGEST p. 895, and the like are able to be used, and the contents of these literatures are incorporated in the present invention. A Quantum Dot Enhancement Film (QDEF, manufactured by NanoSys Co., Ltd) is able to be used as such a quantum dot sheet.

Preferred emission center wavelengths of light rays which are emitted from the backlight unit are as follows. In the blue light, it is preferable that the light emission center wavelength is in a wavelength range of 440 nm to 470 nm. In the green light, it is preferable that the light emission center wavelength is in a wavelength range of 520 nm to 570 nm. In the red light, it is preferable that the light emission center wavelength is in a wavelength range of 600 nm to 640 nm.

It is preferable that all of the half-widths of the blue light described above, the green light described above, and the red light described above are less than or equal to 100 nm.

The half-width of the blue light emitted from the backlight unit preferably has a light emission intensity peak of less than or equal to 80 nm, more preferably has a light emission intensity peak of less than or equal to 70 nm, and particularly preferably has a light emission intensity peak of less than or equal to 30 nm.

The half-width of the green light emitted from the backlight unit preferably has a light emission intensity peak of less than or equal to 80 nm, more preferably has a light emission intensity peak of less than or equal to 70 nm, and particularly preferably has a light emission intensity peak of less than or equal to 60 nm.

The half-width of the red light emitted from the backlight unit preferably has a light emission intensity peak of less than or equal to 80 nm, more preferably has a light emission intensity peak of less than or equal to 70 nm, and particularly preferably has a light emission intensity peak of less than or equal to 60 nm.

As a result of studies of the present inventors, a difference (Reflection Center Wavelength−Emission Center Wavelength) between the light emission center wavelength (a wavelength providing a light emission intensity peak) of the blue light, the green light, and the red light of the backlight unit, and the reflection center wavelength (a wavelength providing a reflectivity peak) of each of the colors in the brightness enhancement film is preferably less than or equal to ±50 nm, and is more preferably less than or equal to ±25 nm, with respect to the blue light and the green light.

On the other hand, the light emission center wavelength of the red light is preferably 0 nm to 75 nm, is more preferably 0 nm to 50 nm, and is even more preferably 10 nm to 30 nm, from the viewpoint of suppressing an oblique change in the shade.

It is preferable that the backlight unit further includes well-known diffusion plates, well-known prism sheets (for example, BEF), and a light guide device. These other members are disclosed in JP3416302B, JP3363565B, JP4091978B, JP3448626B, and the like.

It is preferable that two prism sheets of which directions of the prisms are substantially parallel are included in the backlight unit, because the front surface brightness of the liquid crystal display device can be further enhanced. The expression "two prism sheets of which directions of the prisms are substantially parallel" means that an angle formed by prisms of the two prism sheets is within ±5°. The prism sheet refers to a sheet in which a plurality of protrusions (in this specification, these protrusions may be also referred to as prisms) projected in one direction of the in-plane of the prism sheet are arranged in a columnar shape. The direction in which the plurality of prisms arranged in a columnar shape are projected is parallel. The direction of the prisms refers to a direction of projection of the plurality of the prisms arranged in a columnar shape. It is possible to increase front surface brightness in a case where two prism sheets of which the direction of the prisms are substantially parallel to each other are used than in a case where two prism sheets of which the direction of the prisms that are substantially vertical to each other are used. The same effect is able to be obtained even in a case where any light sources described above are combined.

A known method is able to be used as a method of bonding the brightness enhancement film or the optical sheet member to the liquid crystal display device. A roll to panel method is able to be used, and the roll to panel method is preferable from the viewpoint of improving productivity and a yield. The roll to panel method is disclosed in JP2011-48381A, JP2009-175653A, JP4628488B, JP4729647B, WO2012/014602A, WO2012/014571A, and the like, but is not limited thereto.

[Layer Changing Polarization State of Light]

It is preferable that a layer changing a polarization state of light is arranged between the light reflection layer on the outermost layer of the brightness enhancement film and the backlight unit. This is because the layer changing the polarization state of the light functions as a layer changing a polarization state of light which is reflected from the light reflection layer, and thus, brightness is able to be improved, a change in the shade is able to be reduced, and coating unevenness is able to be relaxed. Examples of the layer changing the polarization state of the light include a polymer layer having a refractive index higher than that of an air layer, and examples of the polymer layer having a refractive index higher than that of the air layer include various low reflection layers such as a hardcoat (HC) treatment layer, an antiglare (AG) treatment layer, and a low reflection (AR) treatment layer, a triacetyl cellulose (TAC) film, an acrylic resin film, a cycloolefin polymer (COP) resin film, a stretched PET film, and the like. The layer changing the polarization state of the light may also function as a support.

A relationship between the average refractive index of the layer changing the polarization state of the light which is reflected from the light reflection layer and the average refractive index of the light reflection layer on the outermost layer, is preferably 0<|Average Refractive Index of Layer Changing Polarization State of Light−Average Refractive Index of Light reflection layer on Outermost Layer|<0.8, is more preferably 0<|Average Refractive Index of Layer Changing Polarization State of Light−Average Refractive Index of Light reflection layer on Outermost Layer|<0.4, and is even more preferably 0<|Average Refractive Index of Layer Changing Polarization State of Light−Average Refractive Index of Light reflection layer on Outermost Layer|<0.2.

The layer changing the polarization state of the light may be integrated with the brightness enhancement film, or may be disposed separately from the brightness enhancement film.

EXAMPLES

Hereinafter, characteristics of the present invention are more specifically described with reference to the examples and comparative examples. An amount used, a treatment detail, a treatment order, and the like can be suitably changed without departing from the gist of the present invention. The scope of the present invention should not be construed in a limited manner.

In this example, the optical characteristics of the liquid crystal film were measured by using a polarimeter AxoScan of Axometrics Inc. A tilt angle of the liquid crystal molecule was obtained by using a measured value of the polarimeter AxoScan of Axometrics Inc. with reference to a method disclosed in Jpn. J. Appl. Phys. 48 (2009) 03B021.

Example 1

[Preparation of Alignment Film]

In order to align the cholesteric liquid crystals used in the light reflection layer, a glass substrate (support) provided with the alignment film was manufactured. The alignment film was manufactured in a method described below with reference to Example 7 disclosed in JP1998-096931A (JP-H10-096931A).

A BCB solution (manufactured by The Dow Chemical Company) was printed as an alignment film, on the surface of the glass substrate (EAGLE manufactured by Corning Incorporated), firing was performed at 80° C. for one minute by using a hot plate, and was further performed at 200° C. for 30 minutes in an $N_2$ oven, so as to perform polymerization. The thickness of the BCB polymer was 50 nm.

A rubbing treatment was performed on two glass substrates on which BCB polymer alignment films were formed. A cloth made of rayon with bristles having a diameter of 0.1 to 10 μm was used as a rubbing cloth. As the rubbing condition, the roller rotation speed was 500 rpm, a substrate moving speed was 50 mm/s, and a push amount was 0.5 mm, and the number of rubbing treatments is one.

Two glass substrates subjected to a rubbing treatment were put into a plasma chamber, and a hydrophobic treatment was performed on the surface of the alignment film. Specifically, these substrates were put into a chamber with vacuum of $1.3 \times 10^{-4}$ Pa ($10^{-6}$ Torr), $NF_3$ gas was introduced so as to be 26.6 Pa (0.2 Torr), a parallel plate electrode of an electrode 900 $cm^2$, and a plasma treatment was performed for three minutes with a distance between the electrodes: 3.5 cm, an applied voltage: 13.56 MHz, and 15 W.

[Preparation of Cholesteric Liquid Crystalline Mixture (R1)]

A coating liquid in the composition below was prepared by mixing respective components below, so as to obtain a cholesteric liquid crystalline mixture (R1).

| Composition of cholesteric liquid crystalline mixture R1 | |
| --- | --- |
| Compound 11 below | 80 parts by mass |
| Compound 12 below | 20 parts by mass |
| Right-handed chiral agent LC756 below (manufactured by BASF SE) | 4.4 parts by mass |
| Polymerization initiator IRGACURE819 (manufactured by BASF SE) | 3 parts by mass |
| Polymerization inhibitor 4-methoxyphenol | 0.1 parts by mass |
| Solvent (Methyl ethyl ketone) | Amount in which the solute concentration is 30 mass % |

Compound 11

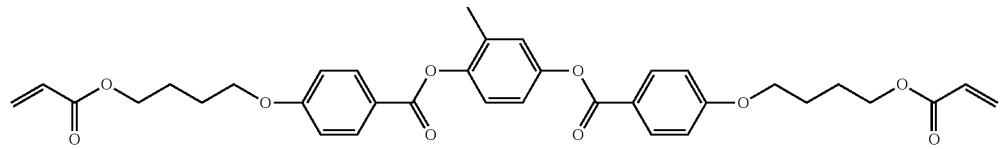 [SMILES: C=CC(=O)OCCCCOc1ccc(C(=O)Oc2ccc(OC(=O)c3ccc(OCCCCOC(=O)C=C)cc3)c(C)c2)cc1]

Compound 12

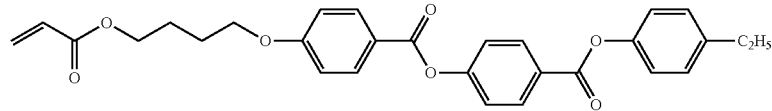 [SMILES: C=CC(=O)OCCCCOc1ccc(C(=O)Oc2ccc(C(=O)Oc3ccc(CC)cc3)cc2)cc1]

[Forming of Light Reflection Layer]

A light reflection layer was formed by using a manufacturing method on which a glass substrate is further overlapped with a coated film with reference to the method disclosed in JP2000-310780A. The surface of the alignment film of the glass substrate provided with the alignment film was coated with the cholesteric liquid crystalline mixture R1 by the coating method. Thereafter, the solvent was removed by performing heating at 70° C. for one minute. A glass substrate provided with the alignment film on this coated surface was layered such that the surface of the alignment film was on the coated surface side. At this point, preparation of the coating amount of the cholesteric liquid crystalline mixture R1 and layering of the substrate were performed such that a film thickness of the layer formed of the cholesteric liquid crystalline mixture was 290 nm. The rubbing direction of the alignment films of the two glass substrates were set to be parallel. The layering was performed while heating was performed to 70° C.

Subsequently, alignment was immobilized by performing irradiation with ultraviolet ray of 500 mJ/cm² using a high pressure mercury lamp, so as to obtain a liquid crystal film. This liquid crystal film was removed from the glass substrate, a cross section was observed by using an electronic microscope (S5000 Series manufactured by Hitachi High-Technologies Corporation) so as to observe a structure corresponding to one pitch twist. The optical characteristics of the liquid crystal film were measured. In the front surface direction, selective reflection was recognized in an area with 450 nm as a center. In the oblique direction, a central wavelength of selective reflection was deviated to a short wave side such that a polar angle becomes 60°, and thus the selective reflection region was deviated to a short wave area than visible light. It was confirmed that an area other than a selective reflection region at a polar angle of 60°, specifically, retardation in 450 nm was approximately 0. This retardation measured value was used, retardation of a liquid crystal film was calculated by using an optical simulator of Shintech Inc. so as to calculate a tilt angle, and the tilt angle was 35°.

Eight sheets of the same liquid crystal films were formed, these were peeled from the respective glass substrates between the alignment film and the liquid crystal film, and eight sheets were laminated by being arranged in the rubbing direction, so as to manufacture a first light reflection layer which was a cholesteric liquid crystal layer for eight pitches. At the time of lamination, integration was performed by heating and compression bonding. Optical characteristics were measured, selective reflection was recognized with 450 nm as a center in the front surface direction, and a reflection rate in 450 nm was approximately 50%. The retardation of 450 nm at a polar angle of 60° was approximately 0, and a tilt angle was 35°.

In the same manner, a liquid crystalline mixture for forming a second light reflection layer was prepared. The second light reflection layer was manufactured in the same method as the coating liquid for forming the first light reflection layer except for changing the concentration of the chiral agent from 4.4 mass % to 3.6 mass %. The liquid crystal film was manufactured in the same manner at the time of forming of the first light reflection layer except for changing the film thickness of the layer formed of the cholesteric liquid crystalline mixture from 290 nm to 350 nm.

The obtained liquid crystal film was also observed and measured in the same method described above. When the cross section was observed with an electronic microscope, a structure corresponding to one pitch twist was observed. Selective reflection was recognized in the area with 550 nm as a center in the front surface direction at the AxoScan measurement or a central wavelength of the selective reflection was deviated to a short wave side in the oblique direction such that the polar angle became 60°, and the selective reflection region was deviated to around 450 nm. The retardation in the 550 nm of the area other than the selective reflection region at a polar angle of 60° was approximately 0, and the calculated tilt angle was 35°. Eight sheets of the same liquid crystal films were formed, these were peeled from the respective glass substrates (between the alignment film and the liquid crystal film), so as to manufacture a second light reflection layer which was a cholesteric liquid crystal layer for eight pitches. Optical characteristics were measured, selective reflection was recognized with 550 nm as a center in the front surface direction, and a reflection rate in 550 nm was approximately 50%. The retardation of 550 nm at a polar angle of 60° was approximately 0, and a calculated tilt angle was 35°.

In the same manner, a coating liquid for forming a third light reflection layer was prepared. The coating liquid was manufactured in the same method as the coating liquid for forming the first light reflection layer except for changing the concentration of the chiral agent from 4.4 mass % to 3.0 mass %. The liquid crystal film was manufactured in the same manner at the time of forming the first light reflection layer except for changing the film thickness of the layer formed of the cholesteric liquid crystalline mixture from 290 nm to 420 nm.

The obtained cholesteric single layer was observed and measured in the same method. When the cross section was observed with an electronic microscope, a structure corresponding to one pitch twist was observed. Selective reflection was recognized in the area with 650 nm as a center in the front surface direction at the AxoScan measurement, or a central wavelength of the selective reflection was deviated to a short wave side in the oblique direction such that the polar angle became 60°, and the selective reflection region was deviated to around 550 nm. The retardation in the 650 nm of the area other than the selective reflection region at a polar angle of 60° was approximately 0, and the calculated tilt angle was 35°. Eight sheets of the same liquid crystal films were formed, these were peeled from the respective glass substrates (between the alignment film and the liquid crystal film), so as to manufacture a third light reflection layer which was a cholesteric liquid crystal layer for eight pitches. Optical characteristics were measured, selective reflection was recognized with 650 nm as a center in the front surface direction, and a reflection rate in 650 nm was approximately 50%. The retardation of 650 nm at a polar angle of 60° was approximately 0, and a calculated tilt angle was 35°.

Comparative Example 1 and Examples 2 to 5

In the same manner as in Example 1, the first light reflection layer, the second light reflection layer, and the third light reflection layer were manufacturing such that a pretilt angle (a tilt angle of a liquid crystal molecule in the light reflection layer on the surface of the alignment film) became 5° (Comparative Example), 15°, 25°, 45°, and 55°.

A pretilt angle of the alignment film was adjusted by changing the plasma processing time, in the forming of the alignment film with Example 1. Specifically, 5° was manufactured by not performing a plasma treatment, and 15°, 25°, 45°, and 55° were manufactured by performing plasma treatments of 0.5 minutes, 1.5 minutes, 5 minutes, and 8 minutes, respectively.

The adjustment of the liquid crystalline mixture and the forming of the light reflection layer were manufactured in the same manner as in Example 1. The oblique retardation of the respective layers measured in the method above was as presented in Table 1.

<Manufacturing of Reflection Polarizer>

The brightness enhancement film was manufactured by using light reflection layers of Examples 1 to 5 and Comparative Example 1. A "QL film" manufactured by Fujifilm Corporation was used in a λ/4 plate. Re (550) of film=125 nm and Rth (550)=1 nm were satisfied.

These first, second, and third light reflection layers were laminated and bonded so as to form reflection polarizers. At the time of bonding, SK2057 manufactured by Soken Chemical & Engineering Co., Ltd. was used as the pressure sensitive adhesive.

<Manufacturing of Polarizing Plate>

As a front-side polarizing plate protective film of a backlight-side polarizing plate, a commercially available cellulose acylate-based film "Z TAC" (manufactured by Fujifilm Corporation) was used.

As a rear-side polarizing plate protective film of a backlight-side polarizing plate, a commercially available cellulose acylate-based film "Z TAC" (manufactured by Fujifilm Corporation) was used.

In the same manner as [0219] of JP2006-293275A, a polarizer was manufactured, the two polarizing plate protective films were respectively bonded to both surfaces of the polarizer, so as to manufacture a polarizing plate.

<Manufacturing of Optical Sheet Member>

An optical sheet member was obtained by bonding the obtained polarizing plate and the reflection polarizer with the pressure sensitive adhesive. At the time of bonding, bonding was performed the QL film side of the reflection polarizer and the polarizing plate were faced with each other.

<Manufacturing of Liquid Crystal Display Device>

A commercially available liquid crystal display device (manufactured by Panasonic Corporation, Product name: TH-L42D2) was decomposed, and the backlight-side polarizing plate was changed to the optical sheet members of the comparative examples and the examples, so as to manufacture liquid crystal display devices of the comparative examples and the examples.

<Evaluation Method>

The manufactured optical sheet members (liquid crystal display devices) were evaluated in the standard below.

(Oblique Shade)

An oblique change in the shade $\Delta u'v'$ of the liquid crystal display device was evaluated by the following method. A shade color difference $\Delta u'v'$ obtained by a difference between the values of shade coordinates u' and v' in a front surface (a polar angle of 0 degrees) and a direction at a polar angle of 60 degrees was measured in a direction of an azimuth angle of 0 degrees to 360 degrees, and the average value thereof was set to an evaluation index of the oblique change in the shade $\Delta u'v'$. The shade coordinates u'v' were measured by using a measurement machine (EZ-Contrast 160D, manufactured by ELDIM Corporation). The results were collectively evaluated on the basis of the following criteria.

A: Less than the oblique change in the shade of the liquid crystal display device of Comparative Example 1 by greater than or equal to 40%, and satisfactory.

B: Less than the oblique change in the shade of the liquid crystal display device of Comparative Example 1 by greater than or equal to 25% and less than 40%, and satisfactory.

C: Less than the oblique change in the shade of the liquid crystal display device of Comparative Example 1 by greater than or equal to 10% and less than 25%, and satisfactory.

D: Worse than or equal to the oblique change in the shade of the liquid crystal display device of Comparative Example 1.

(Oblique Brightness)

The oblique brightness of the liquid crystal display device was evaluated in the method below. The value of the brightness was measured at a polar angle of 60° and an azimuth angle of 0° to 360°, and the average value thereof was set as an evaluation index of oblique brightness. In the measurement of the brightness, a measurement machine (EZ-Contrast 160D, manufactured by ELDIM S.A.) was used. Based on the results thereof, evaluation was performed in the standards below.

A: Oblique brightness was higher than the oblique brightness of the liquid crystal display device of Comparative Example 1 by greater than or equal to 30% and satisfactory.

B: Oblique brightness was higher than the oblique brightness of the liquid crystal display device of Comparative Example 1 by greater than or equal to 20% and less than 30% and satisfactory.

C: Oblique brightness was higher than the oblique brightness of the liquid crystal display device of Comparative Example 1 by greater than or equal to 10% and less than 20% and satisfactory.

D: Oblique brightness was equal to or less than the oblique brightness of the liquid crystal display device of Comparative Example 1.

layers of a blue light reflection layer, a green light reflection layer, and a red light reflection layer.

Example 11

[Preparation of Alignment Film]

The glass substrate provided with the alignment film was manufactured in order to align chiral smectic C liquid crystals used in the light reflection layer in the same manner. Firing was performed at 80° C. for one minute by using a hot plate and was further performed at 200° C. for 30 minutes in an $N_2$ oven, by printing SE-4811 manufactured by Nissan Chemical Industries, Ltd. as an alignment film, on the surface of the glass substrate (EAGLE manufactured by Corning Incorporated). The thickness of the alignment film was 50 nm.

TABLE 1

| | | | Comparative Example 1 | Example 1 | Example 2 | Example 3 | Example 4 | Example 5 |
|---|---|---|---|---|---|---|---|---|
| Light reflection layer | Blue | Tilt angle | 5° | 35° | 15° | 25° | 45° | 55° |
| | | Oblique retardation | 80 nm | 1 nm | 63 nm | 35 nm | −38 nm | −72 nm |
| | | Absolute value of oblique retardation | 80 nm | 1 nm | 63 nm | 35 nm | 38 nm | 72 nm |
| | Green | Tilt angle | 5° | 35° | 15° | 25° | 45° | 55° |
| | | Oblique retardation | 95 nm | 0 nm | 74 nm | 41 nm | −41 nm | −85 nm |
| | | Absolute value of oblique retardation | 95 nm | 0 nm | 74 nm | 41 nm | 41 nm | 85 nm |
| | Red | Tilt angle | 5° | 35° | 15° | 25° | 45° | 55° |
| | | Oblique retardation | 108 nm | 1 nm | 85 nm | 47 nm | −47 nm | −97 nm |
| | | Absolute value of oblique retardation | 108 nm | 1 nm | 85 nm | 47 nm | 47 nm | 97 nm |
| Oblique shade Δu'v' | | | D | A | C | B | B | C |
| Oblique brightness | | | D | A | C | B | B | C |

From the results presented in Table 1, oblique shades and oblique brightness in Example 1 to 5 were improved, compared with Comparative Example 1. It is considered that this is because the absolute value of oblique retardation was reduced by applying a proper tilt angle in the respective

[Preparation of Chiral Smectic C Liquid Crystalline Mixture (R11)]

Respective components below were mixed, the coating liquid in the composition below was prepared so as to obtain a chiral smectic C liquid crystalline mixture (R11).

| Chiral smectic C liquid crystalline mixture R11 | |
|---|---|
| Compound 21 | 67 parts by mass |
| Compound 22 | 33 parts by mass |
| Right-handed chiral agent 23 | 2.8 parts by mass |
| Polymerization initiator IRGACURE 819 (manufactured by BASF SE) | 3 parts by mass |
| Polymerization inhibitor 4-methoxyphenol | 0.1 parts by mass |

Compound 21

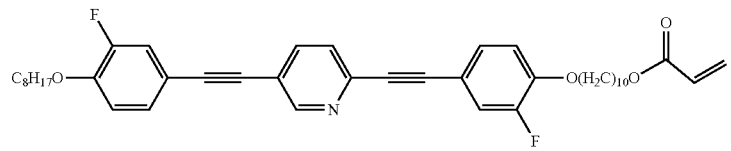

Compound 22

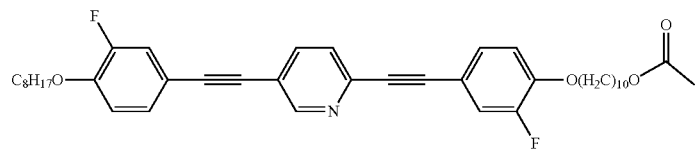

| Chiral smectic C liquid crystalline mixture R11 |
| --- |

Right-handed chiral agent 23

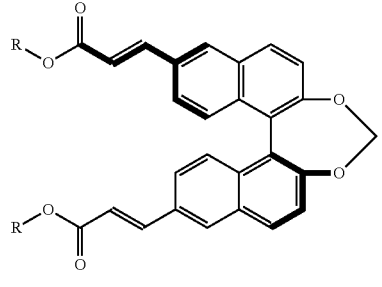

R = n-C$_4$H$_9$

[Forming of Light Reflection Layer]

First, the first light reflection layer was formed. Cells were caused to face with each other such that the surfaces of the alignment films became inside. At this point, the film thickness of the layer formed from the chiral smectic C liquid crystalline mixture was 2.3 μm. The chiral smectic C liquid crystalline mixture R11 was injected to a gap between the cells facing with each other that were manufactured by causing the cells to face the glass substrate provided with the alignment film. Subsequently, after the cells were heated to the temperature of 120°, the temperature was reduced to room temperature by performing cooling at 0.1°/min.

Subsequently, alignment was immobilized by performing irradiation with ultraviolet ray of 500 mJ/cm$^2$ by using a high pressure mercury lamp so as to obtain a liquid crystal film. This liquid crystal film was removed from the glass substrate, a cross section was observed by using an electronic microscope (S5000 Series manufactured by Hitachi High-Technologies Corporation) so as to observe a structure corresponding to eight pitch twist. This was set as a first light reflection layer.

Subsequently, optical characteristics of the first light reflection layer were measured. In the front surface direction, selective reflection was recognized in an area with 450 nm as a center, and a reflection rate in 450 nm was approximately 50%. In the oblique direction, if a central wavelength of the selective reflection was deviated to a short wave side in the oblique direction such that the polar angle became 60°, the selective reflection region is deviated from the visible light to the area of the short wave. The tilt angle was calculated by using an optical simulator of Shintech Inc. by using a retardation measured value of the first light reflection layer, and the tilt angle was 45°.

In the same manner, the liquid crystalline mixture for forming the second light reflection layer was prepared. The liquid crystalline mixture was manufactured in the same method as the coating liquid for forming the first light reflection layer except for changing the concentration of the chiral agent to 2.3 mass %. The second light reflection layer was manufactured in the same manner at the time of forming the first light reflection layer except that the layer thickness was 2.8 μm.

The obtained second light reflection layer was observed and measured in the same method. If the cross section was observed with an electronic microscope, a structure corresponding to eight pitch twist was observed. Selective reflection was recognized in the area with 550 nm as a center in the front surface direction at the AxoScan measurement, or a central wavelength of the selective reflection was deviated to a short wave side in the oblique direction such that the polar angle became 60°, and the selective reflection region was deviated to around 450 nm. The optical characteristics were measured, selective reflection was recognized with 550 nm as a center in the front surface direction, and a reflection rate at 550 nm was approximately 50%. The calculated tilt angle was 45°.

In the same manner, the liquid crystalline mixture for forming the third light reflection layer was prepared. The liquid crystalline mixture was manufactured in the same method as the coating liquid for forming the first light reflection layer except for changing the concentration of the chiral agent to 1.9 mass %. The third light reflection layer was manufactured in the same manner at the time of forming the first light reflection layer except that the layer thickness was 3.4 μm.

The obtained third light reflection layer was observed and measured in the same method above. If the cross section was observed with an electronic microscope, a structure corresponding to eight pitch twist was observed. Selective reflection was recognized in the area with 650 nm as a center in the front surface direction at the AxoScan measurement, or a central wavelength of the selective reflection was deviated to a short wave side in the oblique direction such that the polar angle became 60°, and the selective reflection region was deviated to around 550 nm. The optical characteristics were measured, selective reflection was recognized with 650 nm as a center in the front surface direction, and a reflection rate at 550 nm was approximately 50%. The calculated tilt angle was 45°.

The obtained first, second, and third light reflection layers were laminated and bonded so as to form a reflection polarizer and also an optical sheet member in the same manner as in Example 1. With respect to this optical sheet member, an oblique shade and oblique brightness were evaluated. As a result, an oblique shade Δu'v' was and B, oblique brightness was B.

Example 12

[Forming of Light Reflection Layer]

The liquid crystal film was manufactured in the same manner as in Example 11 except for changing the concentration of the chiral agent of the liquid crystalline mixture for forming the first light reflection layer of Example 11 to 2.5 mass % and changing the layer thickness to 2.6 μm. This liquid crystal film was peeled off from the glass substrate, and further this liquid crystal film was stretched by 20% respectively in X axis and Y axis directions of the in-plane by using a biaxially stretching machine, so as to obtain a new first light reflection layer. A cross section of the obtained first light reflection layer was observed with an electronic microscope, so as to observe a structure corresponding to eight pitch twist. Selective reflection was recognized in the area with 450 nm as a center in the front surface direction at the AxoScan measurement, or a central wavelength of the selective reflection was deviated to a short wave side in the oblique direction. The optical characteristics were measured, selective reflection was recognized with 450 nm as a center in the front surface direction, and a reflection rate at 450 nm was approximately 50%. The retardation of 450 nm at a polar angle of 60° was approximately 0, and the calculated tilt angle was 35°.

In the same manner, the liquid crystal film was manufactured in the same manner, except for changing the concentration of the chiral agent of the forming of the first light reflection layer to 2.1 mass % and changing the layer thickness to 3.1 μm. This liquid crystal film was peeled off from the glass substrate, and further this liquid crystal film was stretched by 15% respectively in X axis and Y axis directions of the in-plane by using a biaxially stretching machine, so as to obtain a new second light reflection layer. A cross section of the obtained liquid crystal film was observed with an electronic microscope, so as to observe a structure corresponding to eight pitch twist. Selective reflection was recognized in the area with 550 nm as a center in the front surface direction at the AxoScan measurement, or a central wavelength of the selective reflection was deviated to a short wave side in the oblique direction. The optical characteristics were measured, selective reflection was recognized with 550 nm as a center in the front surface direction, and a reflection rate at 550 nm was approximately 50%. The retardation of 550 nm at a polar angle of 60° was approximately 0, and the calculated tilt angle was 35°.

In the same manner, the liquid crystal film was manufactured in the same manner, except for changing the concentration of the chiral agent of the forming of the first light reflection layer to 1.8 mass % and changing the layer thickness to 3.6 μm. This liquid crystal film was peeled off from the glass substrate, and further this liquid crystal film was stretched by 15% respectively in X axis and Y axis directions of the in-plane by using a biaxially stretching machine, so as to obtain a new third light reflection layer. A cross section of the obtained liquid crystal film was observed with an electronic microscope, so as to observe a structure corresponding to eight pitch twist. Selective reflection was recognized in the area with 650 nm as a center in the front surface direction at the AxoScan measurement, or a central wavelength of the selective reflection was deviated to a short wave side in the oblique direction. The optical characteristics were measured, selective reflection was recognized with 650 nm as a center in the front surface direction, and a reflection rate at 650 nm was approximately 50%. The retardation of 650 nm at a polar angle of 60° was approximately 0, and the calculated tilt angle was 35°.

The obtained first, second, and third light reflection layers were laminated and bonded so as to form a reflection polarizer and also an optical sheet member in the same manner as in Example 1. With respect to this optical sheet member, an oblique shade and oblique brightness were evaluated. As a result, the oblique shade Δu'v' was A, and oblique brightness was A.

Example 21

[Preparation of Tilted Cholesteric Liquid Crystalline Mixture (R21)]

Respective components below were mixed, and the coating liquid in the composition below was prepared so as to obtain a tilted cholesteric liquid crystalline mixture (R21).

| Composition of tilted cholesteric liquid crystalline mixture R21 | |
| --- | --- |
| Compound 31 below | 30 parts by mass |
| Compound 32 below | 20 parts by mass |
| Compound 33 below | 46 parts by mass |
| Right-handed chiral agent S811 below (manufactured by Merck & Co., Inc.) | 6.7 parts by mass |
| Compound 11 below | 5 parts by mass |
| Polymerization initiator IRGACURE 819 (manufactured by BASF SE) | 0.2 parts by mass |

Compound 31

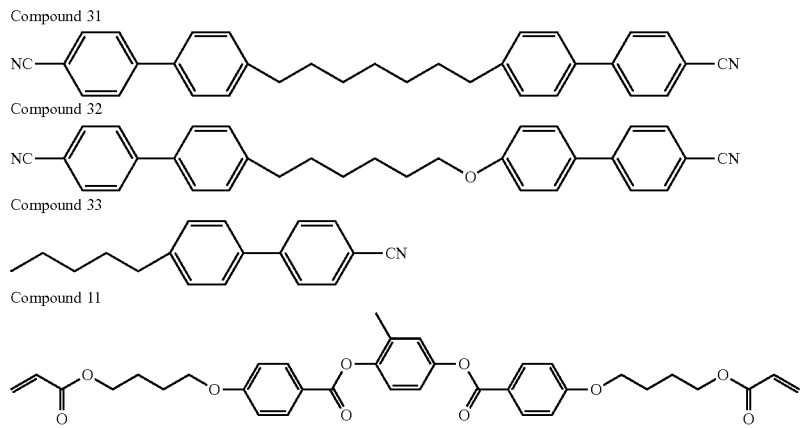

Compound 32

Compound 33

Compound 11

A cell was manufactured by interposing this tilted cholesteric liquid crystalline mixture (R21) between two glass substrates with an ITO electrode. The surface of the glass substrate on the ITO electrode side was coated with an alignment film in the same manner as in Example 1. The liquid crystal cell was manufactured such that the thickness of the film of the cholesteric liquid crystalline mixture after the rubbing treatment was performed became 4 μm. If a voltage was applied to this in room temperature, it was observed from the front surface that a selective reflection wavelength was changed to a short wavelength as the applied voltage was caused to be greater. In a state in which a voltage was applied such that a selective reflection wavelength center of the front surface was 450 nm, irradiation with ultraviolet ray of 500 mJ/cm$^2$ was performed by using a high pressure mercury lamp, and alignment of the tilted cholesteric liquid crystalline mixture was immobilized. In this manner, the first light reflection layer was manufactured. With respect to the obtained first light reflection layer, the optical characteristics were measured. In the front surface direction, selective reflection was recognized in the area with 450 nm as a center. In the oblique direction, a central wavelength of the selective reflection was deviated to a short wave side, and if the polar angle became 60°, the selective reflection region was deviated to an area of a short wave. It was checked that an area other than the selective reflection region at a polar angle of 60°, specifically, retardation in 450 nm was approximately 0. The retardation of the first light reflection layer was calculated by using this retardation measured value and using an optical simulator of Shintech Inc., a tilt angle was calculated, and a tilt angle was 35°.

In the same manner, the liquid crystal film was manufactured in the same manner, except for changing the concentration of the chiral agent to 5.5 mass % and changing a thickness of the film of the tilted cholesteric liquid crystalline mixture to 4.9 μm, so as to obtain a second light reflection layer. Selective reflection in the area with 550 nm as a center was recognized in the front surface direction of AxoScan measurement, or a central wavelength of the selective reflection in the oblique direction was deviated to a short wave side. The optical characteristics were measured, selective reflection was recognized with 550 nm as a center in the front surface direction, and a reflection rate at 550 nm was approximately 50%. The retardation of 550 nm at a polar angle of 60° was approximately 0, and the calculated tilt angle was 35°.

In the same manner, the light reflection layer was manufactured in the same manner, except for changing the concentration of the chiral agent to 4.6 mass % and changing a thickness of the film of the tilted cholesteric liquid crystalline mixture to 6 μm, so as to obtain a third light reflection layer. Selective reflection in the area with 650 nm as a center was recognized in the front surface direction of AxoScan measurement, or a central wavelength of the selective reflection in the oblique direction was deviated to a short wave side. The optical characteristics were measured, selective reflection was recognized with 650 nm as a center in the front surface direction, and a reflection rate at 650 nm was approximately 50%. The retardation of 650 nm at a polar angle of 60° was approximately 0, and the calculated tilt angle was 35°.

The obtained first, second, and third light reflection layers were laminated and bonded so as to form a reflection polarizer and also an optical sheet member in the same manner as in Example 1. With respect to this optical sheet member, an oblique shade and oblique brightness were evaluated. As a result, the oblique shade Δu'v' was A, and oblique brightness was A.

EXPLANATION OF REFERENCES 1 backlight-side polarizing plate
10 support
11 brightness enhancement film
12 λ/4 plate
13 reflection polarizer
14a first light reflection layer
14b second light reflection layer
14c third light reflection layer
15 polarizer
16 polarizing plate protective film
20 adhesive layer (pressure sensitive adhesive)
21 optical sheet member
31 backlight unit
41 thin layer transistor substrate
42 liquid crystal cell
43 color filter substrate
44 display side polarizing plate
51 liquid crystal display device

What is claimed is:

1. An optical film comprising:
a light reflection layer,
wherein the light reflection layer is a layer in which alignment of liquid crystal molecules is immobilized,
wherein the liquid crystal molecule forms a helical structure in a film thickness direction of the light reflection layer,
wherein a tilt angle, an angle formed by a director direction of the liquid crystal molecule and a layer plane, of the liquid crystal molecule is 30° to 40°, and
wherein the absolute value of retardation of the light reflection layer at a polar angle of 60° is 0 to 40 nm at a wavelength of 550 nm.

2. The optical film according to claim 1,
wherein the tilt angle is 35°.

3. The optical film according to claim 1,
wherein the light reflection layer is a layer obtained by curing a polymerizable liquid crystal composition including a liquid crystal compound and a chiral agent.

4. The optical film according to claim 1,
wherein a light reflection layer reflecting blue light, a light reflection layer reflecting green light, and a light reflection layer reflecting red light are included as the light reflection layer.

5. The optical film according to claim 1,
wherein the light reflection layer is a layer in which a phase obtained by tilting a cholesteric liquid crystalline phase is immobilized.

6. The optical film according to claim 2,
wherein the light reflection layer is a layer in which a phase obtained by tilting a cholesteric liquid crystalline phase is immobilized.

7. The optical film according to claim 1,
wherein the light reflection layer is a layer in which a chiral smectic C phase is immobilized.

8. The optical film according to claim 1, further comprising:
a λ/4 plate.

9. The optical film according to claim 1, further comprising:
a polarizing plate; and
a λ/4 plate,
wherein the polarizing plate, the λ/4 plate, and the light reflection layer are laminated in this order.

10. A liquid crystal display device comprising:
the optical film according to claim 1.

11. A manufacturing method of the optical film according to claim 1, comprising:
forming the light reflection layer by a method including curing a polymerizable liquid crystal composition including a liquid crystal compound and a chiral agent interposed between a support and another support.

12. The manufacturing method according to claim 11, wherein the support has an alignment film, and
wherein the alignment film comes into contact with the polymerizable liquid crystal composition.

13. The manufacturing method according to claim 11, wherein the other support has an alignment film, and
wherein the alignment film comes into contact with the polymerizable liquid crystal composition.

14. The manufacturing method according to claim 11, further comprising:
laminating the layers obtained by curing the polymerizable liquid crystal composition to be 2 to 20 layers.

15. The manufacturing method according to claim 14, wherein each of the layers laminated is for one pitch of the helical structure.

16. The manufacturing method according to claim 14, wherein the lamination is performed by bringing the layers into contact with each other and performing heating and compression bonding.

17. The manufacturing method according to claim 11, further comprising:
stretching the layers obtained by curing the polymerizable liquid crystal composition.

18. The manufacturing method according to claim 11, wherein the curing is performed on the polymerizable liquid crystal composition to which a voltage is applied.

19. The liquid crystal display device according to claim 10,
wherein a light reflection layer reflecting blue light, a light reflection layer reflecting green light, and a light reflection layer reflecting red light are included as the light reflection layer, and
wherein a difference between a light emission center wavelength of blue light, green light, and red light of a backlight unit, and a reflection center wavelength of each color in the optical film (Reflection Center Wavelength−Emission Center Wavelength) is −25 nm to 25 nm with respect to the blue light and the green light, and 10 nm to 30 nm with respect to the red light.

* * * * *